(12) United States Patent
Brinkmann et al.

(10) Patent No.: US 11,309,763 B2
(45) Date of Patent: Apr. 19, 2022

(54) STATOR ASSEMBLY

(71) Applicant: Beckhoff Automation GmbH, Verl (DE)

(72) Inventors: Rolf Brinkmann, Bad Salzuflen (DE); Lukas Bentfeld, Delbrück (DE); Uwe Prüssmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/116,532

(22) Filed: Dec. 9, 2020

(65) Prior Publication Data
US 2021/0091622 A1    Mar. 25, 2021

Related U.S. Application Data

(63) Continuation of application No. PCT/EP2019/068149, filed on Jul. 5, 2019.

(30) Foreign Application Priority Data

Jul. 25, 2018  (DE) .................. 10 2018 117 953.7

(51) Int. Cl.
*H02K 41/03*    (2006.01)
*H02K 3/47*    (2006.01)

(52) U.S. Cl.
CPC ............. *H02K 3/47* (2013.01); *H02K 41/031* (2013.01); *H02K 2201/18* (2013.01)

(58) Field of Classification Search
CPC ...... G10H 1/346; H02K 2201/18; H02K 3/47; H02K 41/03; H02K 41/031; H02K 1/12;
(Continued)

(56) References Cited

U.S. PATENT DOCUMENTS

| 4,126,797 A | 11/1978 | Kling |
| 4,458,227 A | 7/1984 | Petersen |

(Continued)

FOREIGN PATENT DOCUMENTS

| DE | 102017131304 A1 | 6/2019 |
| DE | 102017131314 A1 | 6/2019 |

(Continued)

OTHER PUBLICATIONS

International Search Report and Written Opinion of PCT/EP2019/068149 dated Oct. 9, 2019, 40 pages including English translation.

(Continued)

*Primary Examiner* — Naishadh N Desai
(74) *Attorney, Agent, or Firm* — Dorsey & Whitney LLP

(57) ABSTRACT

A stator assembly for driving a rotor of an electrical planar motor includes a first arrangement of longitudinal stator layers and a second arrangement of oblique stator layers. The longitudinal stator layers comprise first coil conductors and the oblique stator layers comprise second coil conductors. The second coil conductors interact with second drive magnets to drive the rotor in a first direction, and the first coil conductors interact with first drive magnets to drive the rotor in a second direction, different from the first direction. The longitudinal and oblique stator layers are arranged on top of one another in a third direction, perpendicular to the first and second directions, where the first arrangement of longitudinal stator layers and the second arrangement of oblique stator layers have a shared central plane, each being symmetrically arranged with regard to the shared central plane, in the third direction.

20 Claims, 13 Drawing Sheets

(58) Field of Classification Search
CPC .. H02K 1/06; H02K 1/00; H02K 1/18; H02K 1/182; H02K 1/185; H02K 1/187
See application file for complete search history.

(56) References Cited

U.S. PATENT DOCUMENTS

| | | | |
|---|---|---|---|
| 9,202,719 B2 | 12/2015 | Lu et al. | |
| 2005/0253463 A1* | 11/2005 | Emoto | G03F 7/70758 310/12.06 |
| 2014/0285122 A1 | 9/2014 | Lu et al. | |
| 2015/0326150 A1* | 11/2015 | Zhu | B23Q 3/15 269/8 |
| 2017/0163140 A1 | 6/2017 | Lu | |
| 2017/0179805 A1* | 6/2017 | Lu | H02N 15/00 |
| 2020/0304009 A1* | 9/2020 | Brinkmann | H02K 3/505 |
| 2020/0304010 A1* | 9/2020 | Brinkmann | B65G 54/02 |

FOREIGN PATENT DOCUMENTS

| | | |
|---|---|---|
| DE | 102017131320 A1 | 6/2019 |
| DE | 102017131324 A1 | 6/2019 |
| DE | 102017131326 A1 | 6/2019 |
| DE | 102017131321.4 B4 | 3/2020 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2017025137 A1 | 2/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |

OTHER PUBLICATIONS

Examination Report of DE 10 2018 117 953.7 dated May 9, 2019, 13 pages including English translation.

* cited by examiner

STATOR ASSEMBLY

CROSS-REFERENCE TO RELATED APPLICATIONS

The present patent application is a continuation of International Patent Application PCT/EP2019/068149, filed Jul. 5, 2019, entitled STATOR FOR A PLANAR MOTOR, and claims the priority of German patent application DE 10 2018 117 953.7, filed Jul. 25, 2018, entitled STATOREINHEIT each of which is incorporated by reference herein, in the entirety and for all purposes.

FIELD

The present invention relates to a stator assembly of an electrical planar motor and to a stator module of an electrical planar motor.

BACKGROUND

Planar drive systems having electrical planar motors may, amongst others, be used in automation technology, in particular in manufacturing technology, handling technology and process technology. By means of planar drive systems, a moveable element of a facility or machine may be moved or positioned in at least two linearly independent directions. Planar drive system may comprise a permanently energized electromagnetic planar motor having a planar stator and a rotor that may be moved in at least two directions on the stator.

In a permanently excited electromagnetic planar motor, a driving force is exerted upon the rotor by energized conductors magnetically interacting with drive magnets of a magnetic arrangement. The present invention particularly relates to embodiments of planar drive systems in which the drive magnets of an electrical planar motor are arranged at the rotor and the energized conductors of the planar motor are arranged in a stationary planar stator.

In such a drive system, the rotor comprises at least one first magnetic unit for driving the rotor in a first direction and a second magnetic unit for driving the rotor in a second direction that is linearly independent from the first direction, e.g. in a direction orthogonal to the first direction. The planar stator comprises at least a group of first energizable conductors which magnetically interact with the magnets of the first magnetic unit in order to drive the rotor in the first direction, as well as a group of second energizable conductors magnetically interacting with the magnets of the second magnetic unit in order to drive the rotor in the second direction. The first and second groups of conductors may in general be energized independently from each other in order to allow for the rotor to move in the first and second direction independently from each other. If the conductors of the first and second group themselves may at least in parts be energized independently from each other, a plurality of rotors may be moved on a stator independently from one another at the same time.

The publications WO 2013/059934 A1, WO 2015/017933 A1, WO 2015/179962 A1, WO 2015/184553 A1, WO 2015/188281 A1, WO 2017/004716 A1 each describe planar drive systems (displacement devices) which comprise an electromagnetic planar motor with a permanently energized rotor and a stator comprising a plurality of energizable conductors.

SUMMARY

The object of the present invention is to provide an improved stator assembly and an improved planar-drive system.

According to a first aspect, a stator assembly for driving a rotor of an electrical planar motor. The stator assembly comprises a first arrangement of longitudinal stator layers and a second arrangement of oblique stator layers. The longitudinal stator layers comprise first coil conductors and wherein the oblique stator layers comprise second coil conductors. The second coil conductors are embodied to interact with second drive magnets of the rotor in order to drive the rotor in a first direction. The first coil conductors are embodied to interact with the first drive magnets of the rotor in order to drive the rotor in a second direction differing from the first direction. The longitudinal stator layers and the oblique stator layers are arranged on top of one another in a third direction oriented perpendicularly to the first and second direction. The longitudinal stator layers and the oblique stator layers have the same mean distance from a stator surface of the stator assembly in the third direction.

According to a second aspect, a stator assembly for driving a rotor of an electrical planar motor. The stator assembly comprises a first arrangement of longitudinal stator layers and a second arrangement of oblique stator layers. The longitudinal stator layers comprise first coil conductors and wherein the oblique stator layers comprise second coil conductors. The second coil conductors are embodied to interact with second drive magnets of the rotor in order to drive the rotor in a first direction. The first coil conductors are embodied to interact with the first drive magnets of the rotor in order to drive the rotor in a second direction differing from the first direction. The longitudinal stator layers and the oblique stator layers are arranged on top of one another in a third direction oriented perpendicularly to the first and second direction. The first arrangement of longitudinal stator layers and a second arrangement of oblique stator layers have a shared central plane and the longitudinal stator layers and the oblique stator layers are each symmetrical in the third direction with regard to the shared central plane.

According to a third aspect, a planar-drive system having a stator module and a rotor. The stator module comprises a module housing and a stator assembly. The stator assembly comprises a first arrangement of longitudinal stator layers and a second arrangement of oblique stator layers. The longitudinal stator layers comprise first coil conductors and wherein the oblique stator layers comprise second coil conductors. The second coil conductors are embodied to interact with second drive magnets of the rotor in order to drive the rotor in a first direction. The first coil conductors are embodied to interact with first drive magnets of the rotor in order to drive the rotor in a second direction differing from the first direction. The longitudinal stator layers and the oblique stator layers are arranged on top of one another in a third direction oriented perpendicularly to the first and second direction. The stator assembly being arranged above the module housing at an upper side of the stator module and comprising a planar stator surface on the upper side of the stator module. The rotor is arranged above the stator surface of the stator module in in a floating position over the stator surface.

EXAMPLES

A stator assembly for driving a rotor of an electrical planar motor comprises a first arrangement of longitudinal stator layers and a second arrangement of oblique stator layers. The longitudinal stator layers comprise first coil conductors and the oblique stator layers comprise second coil conductors. In this context, the second coil conductors are embodied to interact with second drive magnets of the rotor in order to drive the rotor in a first direction, and the first coil conductors are embodied to interact with first drive magnets of the rotor in order to drive the rotor in a second direction differing from the first direction. The longitudinal stator layers and oblique stator layers are arranged on top of one another in a third direction oriented perpendicularly to the first and second direction. In the third direction, the longitudinal stator layers and the oblique stator layers have the same mean distance from a stator surface of the stator assembly.

In this context, the mean distance of the longitudinal stator layers is the mean value of all distances of the individual longitudinal stator layers from the stator surface. The mean distance of the oblique stator layers is the mean value of all distances of the individual oblique stator layers from the stator surface.

If the longitudinal and the oblique stator layers have the same mean distance with regard to the stator surface of the stator assembly, a drive current in the first coil conductors of the longitudinal stator layers exerts approximately the same force onto a rotor arranged above the stator surface as the same drive current in the second coil conductors of the oblique stator layers in the first direction. The result may be an approximately symmetrical transfer of force onto the rotor.

In a further embodiment of the stator assembly, the first arrangement of longitudinal stator layers and the second arrangement of oblique stator layers have a shared central plane and the longitudinal stator layers and the oblique stator layers are each symmetrical in the third direction with regard to the shared central plane.

By respectively arranging the longitudinal stator layers and the oblique stator layers symmetrically around the shared central plane, the first arrangement of longitudinal stator layers as well as the second arrangement of oblique stator layers have the same mean distance from the stator surface and from a rotor of the planar motor arranged in the third direction above or below the first and second arrangement.

In the resulting symmetrical arrangement of the longitudinal stator layers and the oblique stator layers around the shared central plane, an approximately symmetrical transfer of force onto the rotor may be achieved in the first and second direction in a simple manner.

In a further embodiment of the stator assembly, a first total number of longitudinal stator layers and a second total number of oblique stator layers are equal. This allows for particularly uniform energizing of the coil conductors of the longitudinal stator layers and of the oblique stator layers.

In a further embodiment of the stator assembly, an topmost stator layer of the stator assembly and a lowermost stator layer of the stator assembly are each embodied as a longitudinal stator layer having first coil conductors, and a second topmost stator layer of the stator assembly and a second lowermost stator layer of the stator assembly are each embodied as an oblique stator layer having second coil conductors. In particular, a longitudinal stator layer as well as an oblique stator layer are positioned particularly close to the rotor.

A further embodiment of the stator assembly comprises inner layers arranged inside of the stator assembly, wherein the inner layers of the stator assembly are each alternatingly embodied as two adjacent oblique stator layers and as two adjacent longitudinal stator layers.

As a result, the oblique stator layers and the longitudinal stator layers are distributed particularly homogeneously over the stator assembly in the third direction. If the inner layers of the stator assembly each alternatingly comprise two adjacent longitudinal stator layers and two adjacent oblique stator layers, the stator assembly has a lower number of layer changes from longitudinal to oblique stator layer. As a result, the parasitic capacitance of the oblique and of the longitudinal stator layers decreases so that the coil conductors may be energized by an alternating current with particularly low loss. This is particularly the case if all first coil conductors of the longitudinal stator layers arranged on top of one another in the third direction and all second coil conductors of the oblique stator layers arranged on top of one another in the third direction are connected in series or in parallel so that direction and strength of current are respectively identical in all first coil conductors arranged on top of one another in the third direction and in all second coil conductors arranged on top of one another in the third direction.

In a further embodiment of the stator assembly, the first coil conductors are embodied as elongated conductor strips and/or conductor paths extending along the first direction and the second coil conductors are embodied as elongated conductor strips and/or conductor paths extending along the second direction. This allows for a particularly space-efficient arrangement of the coil conductors of the longitudinal and oblique stator layers.

In a further embodiment of the stator assembly, the first arrangement has six longitudinal stator layers and the second arrangement comprises six oblique stator layers. Such a stator assembly has a compact design in the third direction and may at the same time transmit a high force onto the rotor.

A further embodiment of the stator assembly may be embodied as a multi-layer circuit board. Such a stator assembly may be manufactured particularly simply and inexpensively.

A stator module for driving a rotor of an electrical planar motor comprises a stator assembly. The stator assembly comprises a first arrangement of longitudinal stator layers and a second arrangement of oblique stator layers. The longitudinal stator layers comprise first coil conductors and the oblique stator layers comprise second coil conductors. In this context, the second coil conductors are embodied to interact with second drive magnets of the rotor in order to drive the rotor in a first direction, and the first coil conductors are embodied to interact with first drive magnets of the rotor in order to drive the rotor in a second direction differing from the first direction. The longitudinal and the oblique stator layers are arranged on top of one another in a third direction oriented perpendicularly to the first and second direction. In the third direction, the longitudinal and oblique stator layers have the same mean distance from a stator surface of the stator assembly.

In such a stator module, an approximately symmetrical transmission of force onto the rotor may be achieved with the stator assembly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to further developments of the planar-drive systems disclosed in publications WO 2013/059934 A1, WO 2015/017933 A1, WO 2015/179962 A1, WO 2015/184553 A1, WO 2015/188281 A1 and WO 2017/004716 A1. The disclosure content of the six aforementioned documents is incorporated as a subject matter of the present description to its full extent by back-reference.

Furthermore, the present invention relates to further developments of planar-drive systems disclosed in German patent applications DE 10 2017 131 304.4, DE 10 2017 131 314.1, DE 10 2017 131 320.6, DE 10 2017 131 321.4, DE 10 2017 131 324.9 and DE 10 2017 131 326.5. The disclosure content of the six aforementioned documents is made a subject matter of the present description to its full extent, and incorporated by reference herein, in the entirety and for all purposes.

Figure 1:
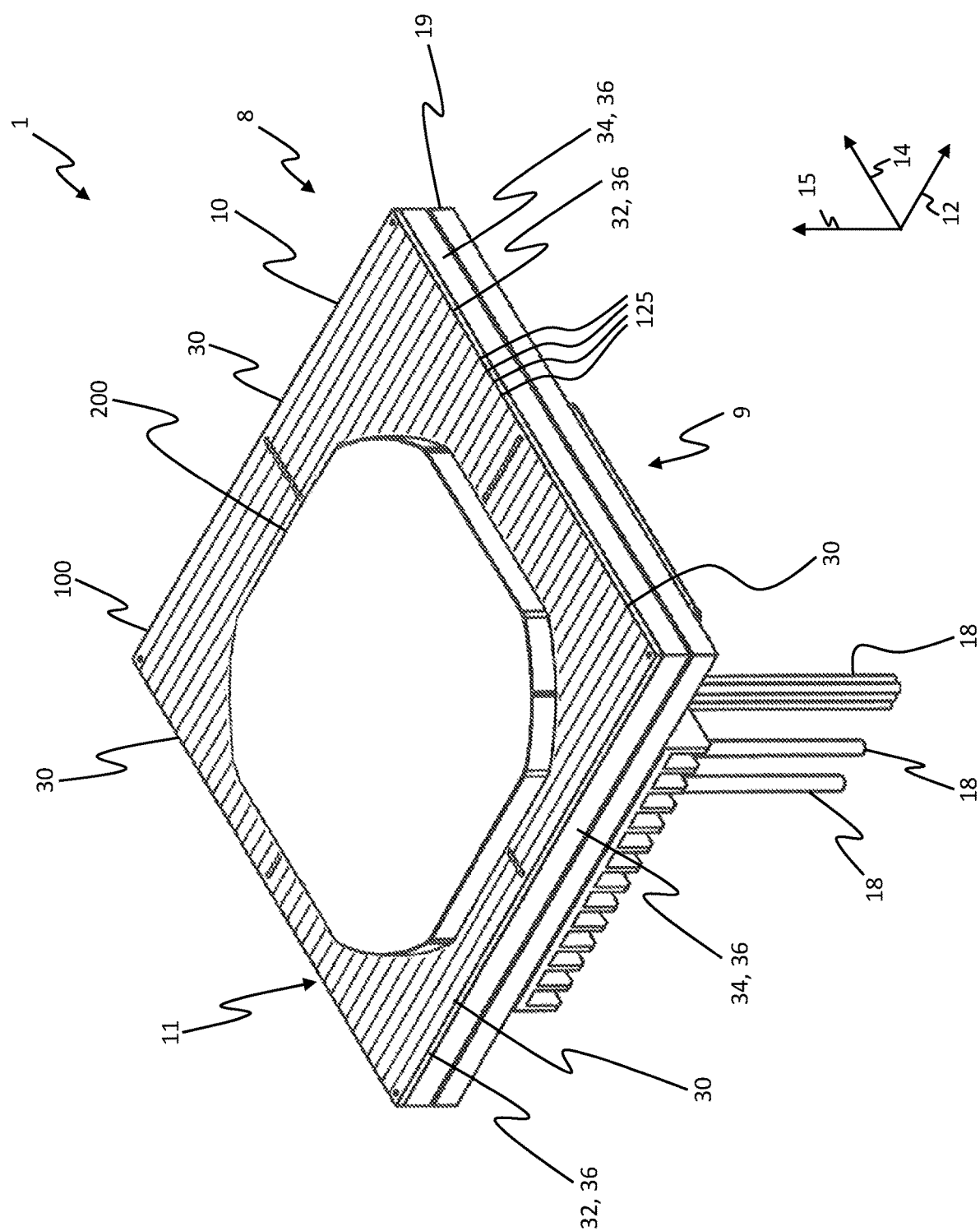
FIG. 1 shows a perspective top view of a planar drive system having a stator module and a rotor.

FIG. 1 shows a perspective top view of a planar-drive system 1 having a stator module 10 and a rotor 200. The stator module 10 comprises a module housing 19 and a stator assembly 100. The stator module 10 comprises an upper side 8 and a bottom side 9 opposite to the upper side 8. The stator assembly 100 is arranged above the module housing 19 and at an upper side 8 of the stator module 10 in a third or vertical direction 15 oriented from the bottom side 9 to the upper side 8. The stator assembly 100 is embodied as a planar stator and comprises a planar stator surface 11 on the upper side 8 of the stator module 10. The stator surface 11 simultaneously forms a surface of the stator module 10.

The stator surface 11 is oriented vertically with regard to the third direction 15 and extends over the entire upper side 8 of the stator assembly 100 and of the stator module 10. The stator assembly 100 comprises on the stator surface 11 at least one first coil conductor 125 energizable with a drive current. As shown, the stator assembly 100 may comprise a plurality of first coil conductors 125 on the stator surface 11. The first coil conductors 125 may each be energized with a drive current. With the drive currents in the first coil conductors 125, a magnetic field may be generated which drives the rotor 200 in interaction with the drive magnets of the rotor 200. The rotor 200 and the stator unit 100 having the current-charged first coil conductors 125 form an electromagnetic planar motor.

In operation, the rotor 200 is arranged above the stator surface 11 of the stator module 10 in a moveable manner and may, in operation, be driven in a first direction 12 as well as in a second direction 14. The first direction 12 and the second direction 14 are different and linearly independent from each other. In particular, the first direction 12 and the second direction 14 may, as shown in FIG. 1, be aligned perpendicularly to each other. The first direction 12 and the second direction 14 are each oriented in parallel to the stator surface 11 and perpendicularly to the third direction 15. By driving the rotor 200 in the first direction 12 as well as in the second direction 14, the rotor 200 may be driven in any desired direction via the stator surface 11. The rotor 200 may in operation be kept in a floating position over the stator surface 11, e.g. with a magnetic interaction between the drive magnets and suitable drive currents in the first coil conductors 125. Apart from driving the rotor 200 in the first and second direction 12, 14, it is also possible to drive the rotor 200 in a third, vertical direction 15.

The stator surface 11 has a rectangular embodiment. In particular, the stator surface 11 may, as shown, have a square shape. The stator surface 11 is delimited by four respectively straight outer edges 30. Two opposite outer edges 30 are respectively in parallel to the first direction 12 and two opposite further outer edges 30 are respectively in parallel to the second direction 14.

An extension of the stator assembly 100 in the third direction 15 is smaller than an extension of the stator assembly 100 in the first and second direction 12, 14. The stator assembly 100 thus forms a flat cuboid extending in the first and second direction 12, 14 or a plate extending in the first and second direction 12, 14. Between the stator surface 11 and a bottom side of the stator assembly 100 opposite to the stator surface 11, the stator assembly 100 comprises four respectively planar side surfaces 32 that are flush with the outer edges 30 of the stator surface 11 at the stator surface 11. The side surfaces 32 of the stator unit 100 are perpendicular to the stator surface 11.

The module housing 19, as the stator surface 11 and the stator assembly 100 in a top view onto the stator surface 11, has a rectangular embodiment. The module housing 19 particularly has a square shape in a top view of the stator surface 11. The module housing 19 is embodied as a flat cuboid or, respectively, as a plate wherein the extension of the module housing 19 is smaller in the third direction 15 than in the first and second direction 12, 14. An upper side of the module housing facing the stator assembly 100 is arranged adjacent to the bottom side of the stator assembly. In the first and second direction 12, 14, the stator unit 100 and the module housing 19 essentially have the same dimensions.

Between the upper side of the module housing 19 facing the stator assembly 100 and a bottom side of the module housing 19 opposite to the upper side, the module housing 19 comprises four respectively planar side faces 34. The side faces 34 of the module housing 19 may, as shown, be oriented perpendicularly to the stator surface 11. The side faces 34 of the module housing 19 may be aligned flush to the side faces 32 of the stator assembly 100 and be adjacent to the side faces 32 of the stator assembly 100. In an alternative embodiment of the stator module 10, the side faces 34 of the module housing 19 may also be set back with regard to the side faces 32 of the stator assembly 100 to the interior of the stator module 10. In a further alternative embodiment, the side faces 34 of the module housing 19 may be arranged at to the upper side of the module housing 19 adjacent to the side faces 32 of the stator assembly 100 and may taper perpendicularly to the third direction 15 towards the bottom side of the module housing 19 in the direction of the interior of the stator module 10.

The stator module 10 has a rectangular embodiment in a top view of the stator surface 11. The stator module 10 comprises four respectively plane side faces 36 between the stator surface 11 arranged at the upper side 8 of the stator module 10 and the bottom side 9 of the stator module 10 arranged opposite to the upper side 8. The side faces 36 of the stator module 10 are formed by the side faces 32 of the stator assembly 100 in the area of the stator assembly 100 and by the side faces 34 of the module housing 19 in the area of the module housing 19.

At the stator surface 11, the side faces 36 of the stator module 10 are thus flush with the outer edges 30 of the stator surface 11 and the outer edges 30 of the stator surface 11 at the same time form the outer edges of the stator module 10 at the stator surface 11. In particular, the stator surface 11 extends in the first direction 12 and in the second direction 14 between two of the side faces 36 of the stator module 10, respectively, and the outer edges 30 delimit the extension of the stator surface 11, of the stator assembly 100 and of the stator module 10 at the side faces 36 of the stator module 10 in the first direction and in the second direction 14.

As shown, the side faces 36 of the stator module 10 may each be aligned perpendicularly to the stator surface 11. In alternative embodiments of the stator module 10, the side faces 36 of the stator module 10 in the range of the module housing 19 may be set back in the direction of the interior of the stator module 10 and may taper from the upper side 8 to the bottom side 9 in the direction of the interior of the stator module 10.

While the stator module 10 has a planar embodiment at its surface formed by the stator surface 11, the stator module 10 may have a non-planar embodiment at the bottom side 9 of the stator module 10 opposite to the stator surface 11. In particular, further components may be arranged at the module housing 19 or at the stator module 10 at the bottom side 9 of the stator module 10 or at the bottom side of the module housing 19. In the first direction 12 or in the second direction 14, these further components extend up until the outer edges 30 of the stator assembly 100 at most so that the further components do not protrude over the outer edges 30 of the stator assembly 100 in the first or the second direction 12, 14.

At the bottom side of the module housing 19, connections are arranged for connecting the stator module 10 with a plurality of connecting lines 18. The connecting lines 18 may e.g. comprise an input line of a data network, an output line of a data network and a power-supply line for supplying the stator module 10 with electrical power. Particularly, the stator module 10 may be provided with electrical power to generate the drive currents with the power-supply line. The stator module 10 may be connected with a control unit of the planar-drive system 1 via the data network and exchange control data with the control unit for controlling the rotor 200.

The stator surface 11 may in the first direction 12 have an extension in a range between 100 mm and 500 mm, in particular between 120 mm and 350 mm, in particular 240 mm. The stator surface 11 may in the second direction 14 have an extension between 100 mm and 500 mm, in particular between 120 mm and 350 mm, in particular 240 mm. The stator module 10 may in the third direction 15 have an extension between 10 mm and 100 mm, in particular between 15 mm and 60 mm, in particular 30 mm. The module housing may in the third direction 15 have an extension between 8 mm and 80 mm, in particular between 13 mm and 55 mm, in particular 26.6 mm. The module housing 19 may in the first and/or second direction 12, 14 have the same extension as the stator surface 11. The stator assembly 100 may in the third direction 15 have an extension of 1 mm to 10 mm, in particular 2 mm to 5 mm, in particular 3.5 mm to 4.5 mm, in particular 3.7 mm to 4 mm.

Several specimens of the stator module 10 may be arranged side-by-side in such a way that the outer edges 30 of neighboring stator modules 10 abut on one another and the stator surfaces 11 of the stator modules 10 form a continuous working surface over which the rotor 200 may be moved without interruption. As the side faces 36 of the stator module 10 are flush with the stator surface 11 at the outer edges 30, the stator surfaces 11 of two stator modules 10 arranged side-by-side may be arranged almost seamlessly in an adjacent manner by arranging the stator modules 10 with abutting side faces 32 of the stator assembly 100 or with abutting outer edges of the stator surfaces 11.

Figure 2:
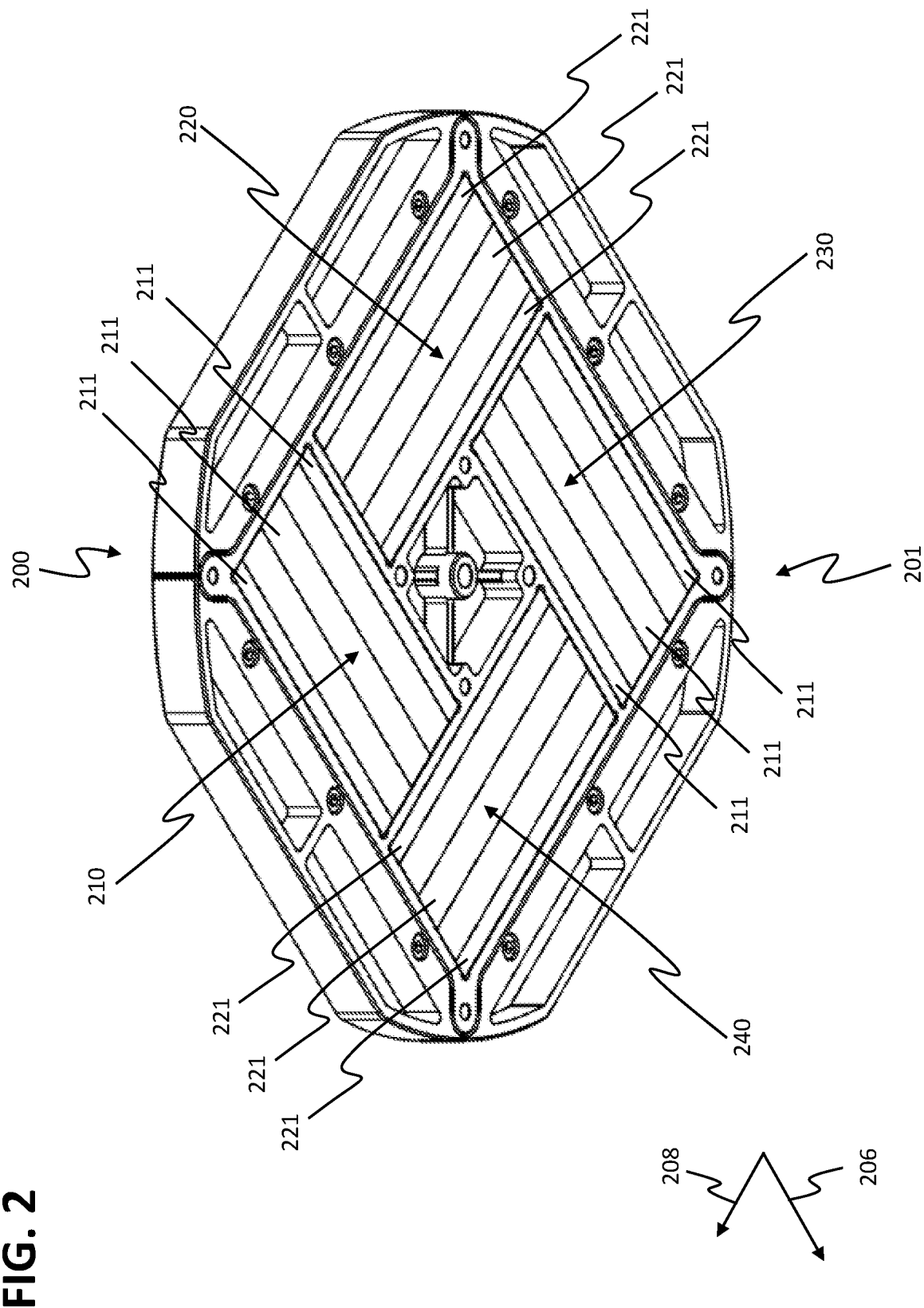
FIG. 2 shows a perspective bottom view of the rotor of the planar drive system having a magnetic arrangement.

FIG. 2 shows the rotor 200 of the planar-drive system 1 in a perspective view from the bottom onto a bottom side of the rotor 200. When operating the planar-drive system 1, the bottom side of the rotor 200 faces the stator surface 11 of the stator module 10. At the bottom side, the rotor 200 comprises a magnetic arrangement 201. The magnetic arrangement 201 has a rectangular, particularly square, embodiment and comprises a plurality of magnets. The bottom side of the rotor 200 has an even or, respectively, planar embodiment in the area of the magnets of the magnetic arrangement 201. In operation, the bottom side of the rotor 200 comprising the magnetic arrangement is oriented essentially in parallel to the stator surface 11 and arranged facing the stator surface 11.

The magnetic arrangement 201 comprises a first magnetic unit 210, a second magnetic unit 220, a third magnetic unit 230 and a fourth magnetic unit 240. The first magnetic unit 210 and the third magnetic unit 230 each comprise first drive magnets 211 that, in a first rotor direction 206, have an elongated extension and are arranged side-by-side along a rotor direction 208 oriented perpendicularly to the first rotor direction 206. In particular, the first and the third magnetic unit 210, 230 may each comprise three first drive magnets 211. The second magnetic unit 220 and the fourth magnetic unit 240 each comprise second drive magnets 221 that are each arranged side-by-side in a first rotor direction 206 and have an elongated extension along the second rotor direction 208. In particular, the second and the fourth magnetic unit 220, 240 may each comprise three second drive magnets 221.

The first and third magnetic unit 210, 230 serve to drive the rotor 200 in the second rotor direction 208 during operation and the second and fourth magnetic unit 220, 240 serve to drive the rotor 200 in the first rotor direction 206 during operation. The first drive magnets 221 of the first and third magnetic unit 210, 230 and the second drive magnets 221 of the second and fourth magnetic unit 220, 240 are each magnetized perpendicularly with regard to the first and second rotor direction 206, 208. In this context, adjacent drive magnets 211, 221 of the magnetic units 210, 220, 230, 240 each comprise opposite magnetization.

Figure 3:
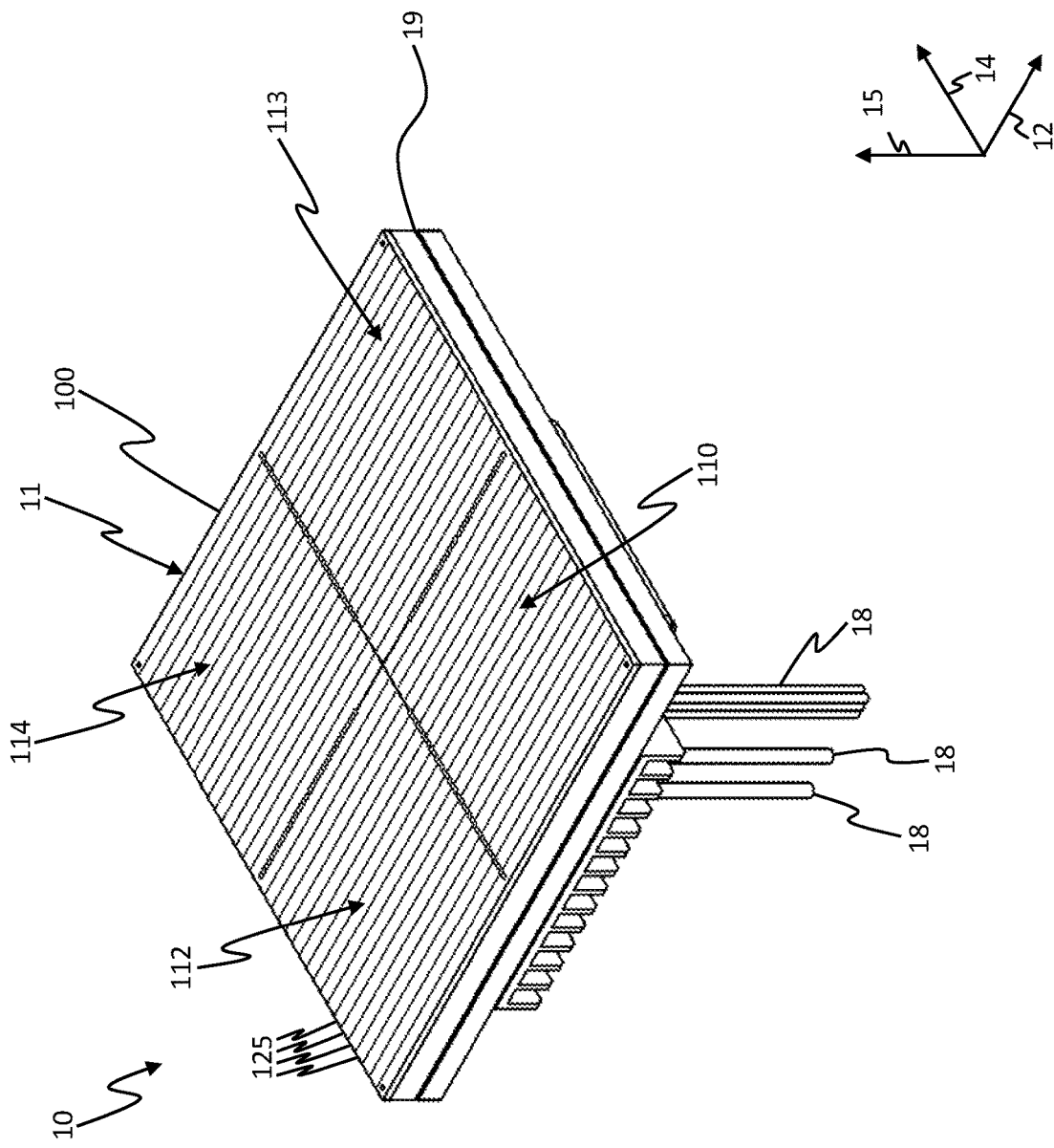
FIG. 3 shows a perspective top view of the stator module of the planar drive system.

FIG. 3 shows the stator module 10 of the planar-drive system 1 in a perspective top view without the rotor 200. The stator assembly 100 of the stator module 100 comprises a first stator sector 110, a second stator sector 112, a third stator sector 113 and a fourth stator sector 114. The stator sectors 110, 112, 113, 114 themselves each comprise a part of the first coil conductor 12 arranged at the stator surface 11 of the stator assembly 100. Each of the first coil conductors 125 at the stator surface 11 is fully arranged in one of the stator sectors 110, 112, 113, 114. The stator sectors 110, 112, 113, 114 have a rectangular embodiment. In particular, the stator sectors 110, 112, 113, 114 may have a square embodiment so that an extension of the stator sectors 110, 112, 113, 114 in the first direction 12 corresponds to an extension of the stator sectors 110, 112, 113, 114 in the second direction 14.

The stator sectors 110, 112, 113, 114 are in the first direction 12 arranged in two side-by-side rows and in the second direction, they are arranged adjacently to each other in two side-by-side rows, as well. The stator sectors 110, 112, 113, 114 of adjacent rows are arranged adjacently to each other, as well. In the first direction 12, the stator assembly 100 comprises a row having the second stator sector 112 and the first stator sector 110 and a further row having the fourth stator sector 114 and the third stator sector 113. In the second direction 14, the stator assembly 100 comprises a row having the first stator sector 110 and the third stator sector 113 and a further row having the second stator sector 112 and the fourth stator sector 114.

In the first direction 12 and in the second direction 14, the stator sectors 110, 112, 113, 114 each have an extension that is half as large as the extension of the stator assembly 100 or, respectively, the extension of the stator module 10 in the corresponding direction 12, 14. The boundaries of the stator sectors 110, 112, 113, 114 thus, in the first and in the second direction 12, 14, each extend in the center of the stator assembly 100 and intersect in the center of the stator assembly 100. The stator sectors 110, 112, 113, 114 each comprise a quarter of the area, i.e. a quadrant, of the stator assembly 100.

In the stator assembly 100 of the stator module 10 shown in FIG. 3, the stator layer at the stator surface 11 only comprises first coil conductors 125 which have an elongated extension in the first direction 12 and are arranged side-by-side and adjacently to each other in a direction perpendicular to the first direction 12. If the first direction 12 and the second direction 14 are oriented perpendicularly to each other, as shown in FIG. 3, the first coil conductors 125 are arranged side-by-side and adjacently to each other along the second direction 14.

Apart from the first coil conductors 125 shown in FIG. 3, the stator assembly 100 comprises second coil conductors. The second coil conductors have an elongated extension along the second direction 14 and arranged side-by-side and adjacently to each other in a direction perpendicular to the second direction 14. If the second direction 14 and the first direction 12 are oriented perpendicularly to each other, the second coil conductors are arranged side-by-side and adjacently to each other along the first direction 12.

Within the stator sectors 110, 112, 113, 114, the first coil conductors 125 and the second coil conductors are arranged in several overlaying stator layers or stator planes, wherein each of the stator layers each comprises either exclusively first coil conductors 125 or exclusively second coil conductors. Apart from the extension of the first coil conductors 125 and of the second coil conductors and to the extent that no differences are described in the following, the stator sectors 110, 112, 113, 114 are embodied identically on the various stator layers.

The stator layer visible in FIG. 3 at the stator surface 11 forms a first stator layer of the stator assembly 100. In the third direction 15 below the first stator layer, the stator assembly 100 comprises at least a second stator layer, a third stator layer and a fourth stator layer.

Figure 4:
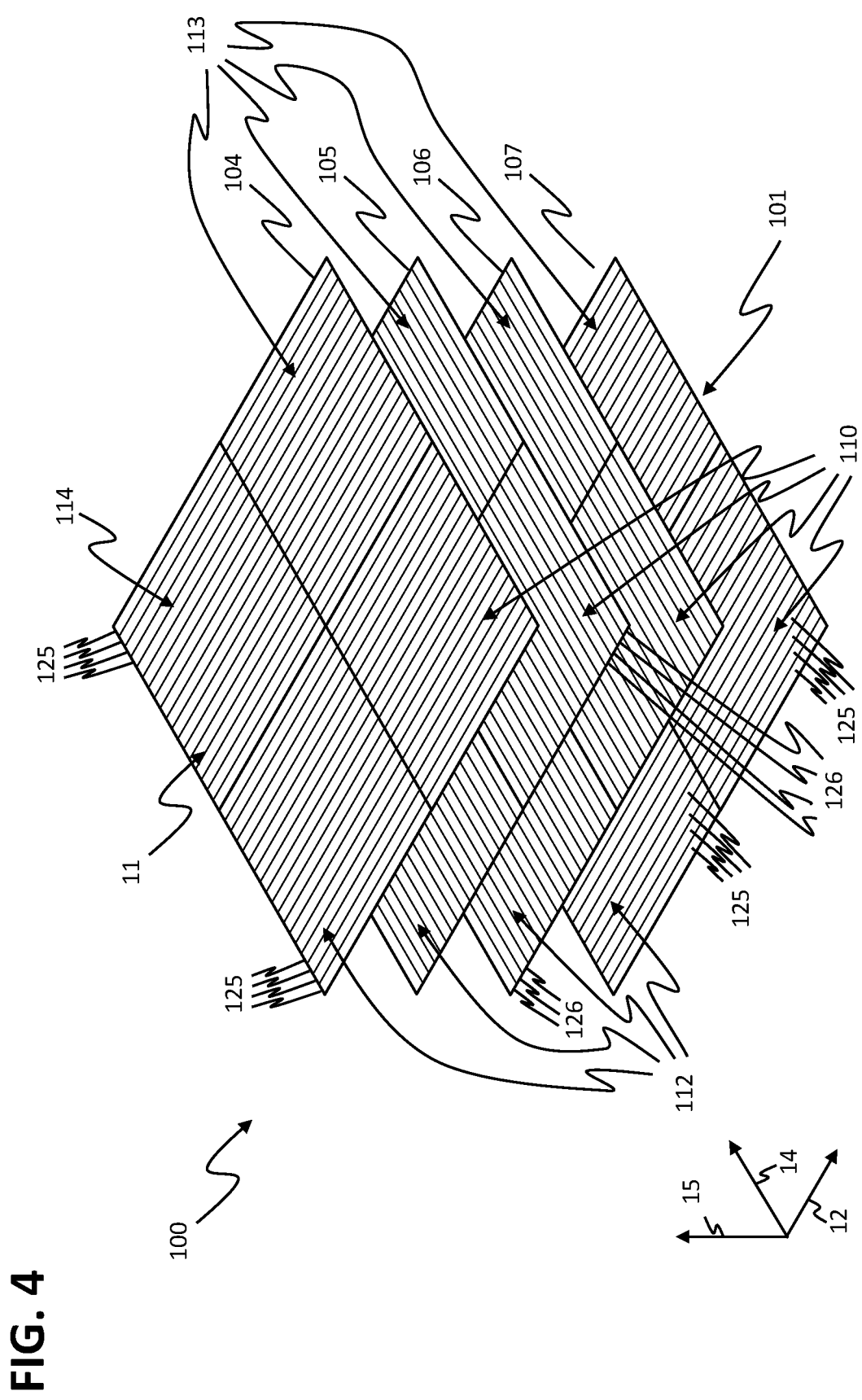
FIG. 4 shows an exploded view of a stator assembly of the stator module with a first, second, third and fourth stator layer.

FIG. 4 shows a schematic perspective view of an exploded view of the stator assembly 100 with individual stator layers.

The stator assembly 100 comprises, in a third direction 15, a second stator layer 105 beneath the first stator layer 104 arranged at the stator surface 11, a third stator layer 106 beneath the second stator layer 105 and a fourth stator layer 107 beneath the third stator layer 106. To the extent that no differences are described in the following, the second, third and fourth stator layer 105, 106, 107 are embodied as described for the first stator layer 104 at the stator surface 11 of the stator assembly 100 shown in FIG. 3.

In the fourth stator layer 107, the stator sectors 110, 112, 113, 114 comprise, as in the first stator layer 104, first coil conductors 125 having an elongated extension along the first direction 12 and arranged side-by-side and adjacently to each other in the direction oriented perpendicularly to the first direction 12. In the second stator layer 105 and in the third stator layer 106, the stator sectors 110, 112, 113, 114 comprise second coil conductors 126. To the extent that no differences are described in the following, the second coil conductors 126 are embodied as described for the first coil conductors 125 in the first stator layer 104 and in the fourth stator layer 107. Other than the first coil conductors 125 of the first and fourth stator layer 104, 107, the second coil conductors 126 of the second and third stator layer 105, 106 have an elongated extension along the second direction 14 and are arranged side-by-side and adjacently to each other in the direction oriented perpendicularly to the second direction 14.

In the first and fourth stator layer 104, 107, the stator sectors 110, 112, 113, 114 exclusively comprise the first coil conductors 125 having an elongated extension along the first direction 12, and not the second coil conductors 126 having an elongated extension along the second direction 14, as well. In the same manner, the stator sectors 110, 112, 113, 114 in the second and third stator layer 105, 106 only comprise the second coil conductors 126 having an elongated extension along the second direction 14, and not the first coil conductors 125 having an elongated extension along the first direction 12, as well.

In all stator layers 104, 105, 106, 107, the stator sectors 110, 112, 113, 114 each comprise identical dimensions. In particular, the stator sectors 110, 112, 113, 114 each comprise identical dimensions in all stator layers 104, 105, 106, 107 in the first direction 12 and in the second direction 14.

The number and arrangement of the first coil conductors 125 is identical to the first coil conductors 125 in the individual overlaying stator layers 104, 107, in particular in the first and fourth stator layer 104, 107. In particular, the first coil conductors 125 are arranged on top of one another in the third direction 15. In addition, the number and arrangement of the second coil conductors 126 is identical to the second coil conductors 126 in the individual overlaying stator layers, in particular in the second and third stator layer 105, 16. In particular, the second coil conductors 126 are arranged on top of one another in the third direction 15.

The coil conductors 125, 16 of stator layers 104, 105, 106, 107 arranged on top of one another are each electrically isolated from one another. For example, the stator assembly 100 may be embodied as a multi-layer circuit board and the stator layers 104, 105, 106, 107 may each be embodied as conductor layers of the multi-layer circuit board that are isolated from one another.

The stator sectors 110, 112, 113, 114 may be energized independently from one another. In particular, the first coil conductors 125 and the second coil conductors 126 of the stator sectors 110, 112, 113, 114 are electrically isolated from one another on the stator assembly 100. This particularly means that the coil conductors 125, 126 of the first stator sectors 110 are electrically isolated from the coil conductors 125, 126 of the second stator sector 112, from the coil conductors 125, 126 of the third stator sectors 113 and from the coil conductors 126, 126 of the fourth stator sector 114. In addition, the coil conductors 125, 126 of the second stator sector 112 are electrically isolated from the coil conductors 125, 126 of the first stator sector 110, from the coil conductors 125, 126 of the third stator sector 113 and from the coil conductors 125, 126 of the fourth stator sector 114. In addition, the coil conductors 125, 126 of the third stator sector 113 are electrically isolated from the coil conductors 125, 126 of the first stator sector 110, from the coil conductors 125, 126 of the second stator sector 112 and from the coil conductors 125, 126 of the fourth stator sector 114. Finally, the coil conductors 125, 126 of the fourth stator sector 114 are electrically isolated from the coil conductors 125, 126 of the first stator sector 110, from the coil conductors 125, 126 of the second stator sector 112 and coil conductors 125, 126 of the third stator sector 113.

Whereas the coil conductors 125, 126 of the individual stator sectors 110, 112, 113, 114 on the stator assembly 100 are each electrically isolated from the coil conductors 125, 126 of the rest of the stator sectors 110, 112, 113, 114, the coil conductors 125, 126 may each be connected to one another in an electrically conductive manner within the individual stator sectors 110, 112, 113, 114. In particular, within the stator sectors 110, 112, 113, 114, all first coil conductors 125 each lying on top of one another in the third direction 15, in particular all first coil conductors 125 of the first stator layer 104 and of the fourth stator layer 107 lying on top of one another in the third direction 15 may be connected to one another in an electrically conductive manner. In this context, all first coil conductors 125 lying on top of one another in the third direction 15 may each be connected to one another in an electrically conductive manner in such a way that the same coil current respectively flows in the first coil connectors 125 lying on top of one another. For example, all first coil conductors 125 of the stator sectors 110, 112, 113, 114 lying on top of one another in the third direction 15 may be connected in series.

In the same manner, all second coil conductors 126 respectively lying on top of one another within the stator sectors 110, 112, 113 114, in particular all second coil conductors 126 of the second stator layer 105 and of the third stator layer 106 lying on top of one another in the third direction 15, may be connected to one another in an electrically conductive manner. In this context, all second coil conductors 126 lying on top of one another in the third direction 15 may each be connected to one another in an electrically conductive manner in such a way that the same coil current respectively flows in the second coil conductors 126 lying on top of one another. For example, all second coil conductors 126 of the stator sectors 110, 112, 113, 114 lying on top of one another may be connected in series.

The coil conductors 125, 126 of the stator sectors 110, 112, 113, 114 each form stator sectors within the stator layers 104, 105, 106, 107.

Figure 5:
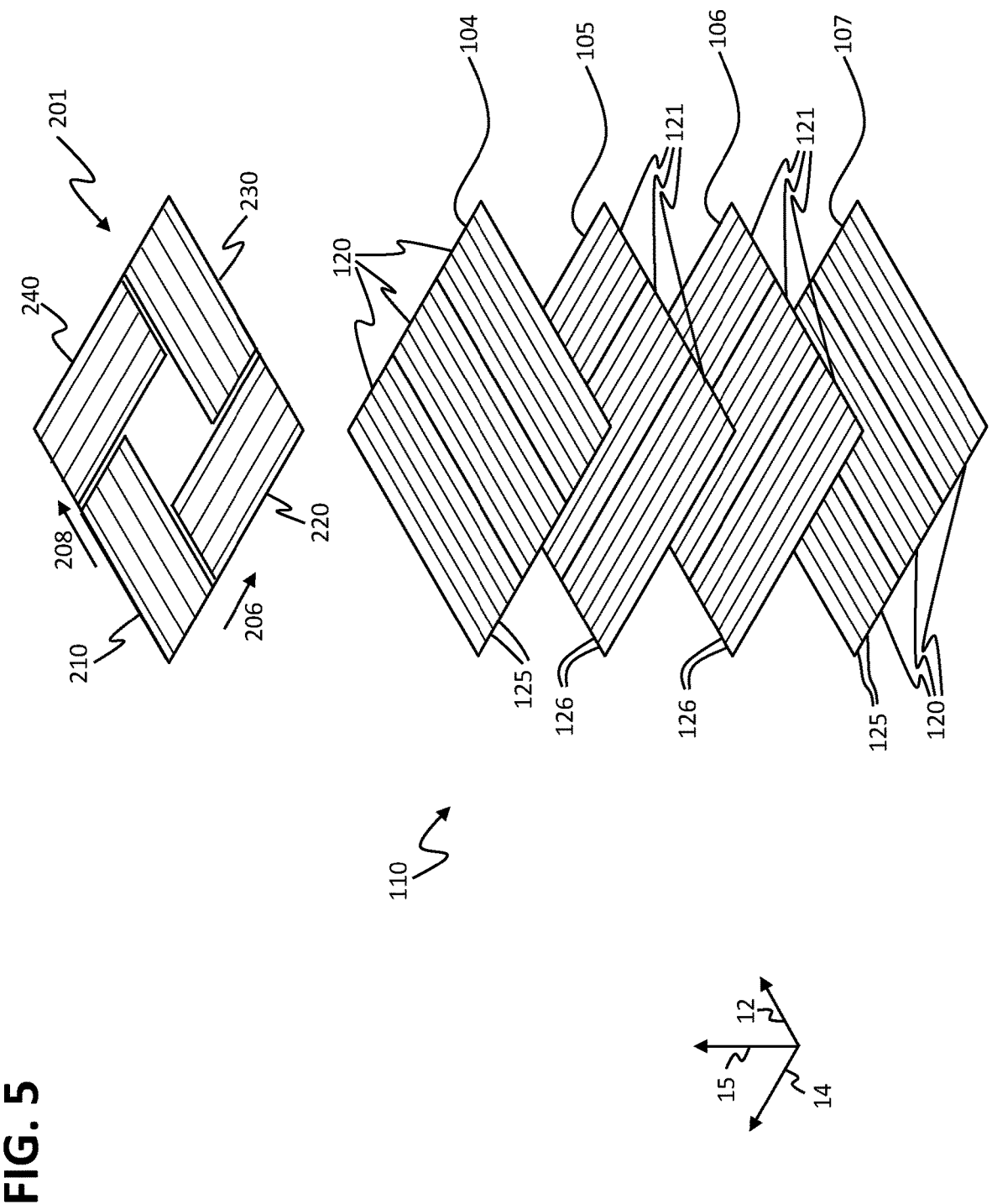
FIG. 5 shows the stator layers of a first stator sector of the stator assembly having individual stator segments.

FIG. 5 schematically shows the stator layers 104, 105, 106, 107 of the first stator sector 110 having individual stator segments.

The coil conductors 125, 126 of the first stator sectors 110 are gathered in the form of stator segments 120, 121 within the stator layers 104, 105, 106, 107. The first stator sector 110 in each stator layer 104, 105, 106, 107 respectively comprises three stator segments 120, 120 arranged in a side-by-side and an adjacent manner. Each of the stator sectors 120, 121 respectively comprises six coil conductors 125, 126 arranged in a side-by-side manner. The first stator sector 110 in the first and fourth stator layer 104, 107 respectively comprises three first stator segments 120 and in the second and third stator layer 105, 106 three second stator segments 121, respectively. The first stator segments 120 each comprise six adjacent ones of the first coil conductors 125 arranged in a side-by-side manner along the second direction 14 and extending in an elongated manner along the first direction 12. The second stator segments 121 each comprise six adjacent ones of the second coil conductors 126 arranged in a side-by-side manner along the first direction 12 and extending in an elongated manner along the second direction 14. In alternative embodiments of the stator assembly 100, the first stator segments 120 and/or the second stator segments 121 may also comprise a different number of coil conductors 125, 126 arranged side-by-side. In particular, the first stator segments 120 and/or the second stator segments 121 may comprise eight coil conductors 125, 126 in a side-by-side arrangement. In alternative embodiments of the stator assembly 100, the first stator sector 110 may also comprise a different number of stator segments 120, 121 arranged side-by-side and adjacent to each other.

The first stator sector 110 of the stator assembly 100 thus in the first stator layer 104 and in the fourth stator layer 107 exclusively comprises first coil conductors 125 that extend along the first direction 12 in an elongated manner, and in the second stator layer 105 and the third stator layer exclusively second coil conductors 126 that extend along the second direction 14 in an elongated manner.

Disregarding their orientation, the first and second stator segments 120, 120 have identical dimensions. In particular, the dimensions of the first stator segments 120 in the first direction correspond to the dimensions of the second stator segments 121 in the second direction 14 and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and fourth stator layer 104, 107 of the first stator sector 110 extends in the first direction 12 over the three second stator segments 121 of the second and third stator layer 105, 106 of the first stator sector 110 arranged in a side-by-side manner. In addition, the second stator segments 121 of the second and third stator layer 105, 106 of the first stator sector 110 extend in the second direction 14 over all first stator segments 120 of the first and fourth stator layer 104, 107 of the first stator sector 110 arranged in a side-by-side manner in the second direction 14.

The arrangement of the coil conductor 125, 126 in the stator layers 104, 105, 106, 107 of the second stator sector 112, of the third stator sector 113 and of the fourth stator sector 114 corresponds to the arrangement of the coil conductors 125, 126 in the stator layers 104, 105, 106, 107 of the first stator sectors 110 shown in FIG. 5.

During operation of the planar-drive system 1, the rotor 200 may be aligned above the stator assembly 100 in such a way that the first rotor direction 206 is oriented along the first direction 12 and the second rotor direction 208 is oriented along the second direction 14. The first magnetic unit 210 and the third magnetic unit 230 may in operation interact with the magnetic field generated by the first coil conductors 125 of the first stator segments 120 in order to drive the rotor 200 along the second direction 14. The second magnetic unit 220 and the fourth magnetic unit 240 may in operation interact with the magnetic field generated by the second coil conductors 126 of the second stator segments 121 in order to drive the rotor 200 along the first direction 12.

As an alternative, the rotor 200, other than shown in FIG. 5, may be aligned in such a way that the first rotor direction 206 is oriented along the second direction 14 and the second rotor direction 208 is oriented along the first direction 12. In this case, the first and the third magnetic unit 210, 230 interact with the magnetic field of the second stator segments 121 for driving the rotor 200 in the first direction 12 and the second and the fourth magnetic unit 220, 240 with the magnetic field of the first stator segment 120 for driving the rotor 200 in the second direction 14.

In the stator assembly 100, the first coil conductors 125 are embodied to interact with the first drive magnets 211 of the rotor 200 in order to drive the rotor 200 in the direction perpendicular to the first direction 12. The second coil conductors 126 are embodied to interact with the second drive magnets 221 of the rotor 200 in order to drive the rotor 200 in the direction perpendicular to the second direction 14.

The first coil conductors 125 are spatially arranged in a displaced manner by each a third of an effective first wavelength of the first drive magnets 211 of the first and third magnetic unit 210, 230 interacting with the first coil conductors 125 in the direction perpendicular to the first direction 12. The second coil conductors 126 are spatially arranged in a displaced manner by each a third of an effective second wavelength of the second drive magnets 221 of the second and fourth magnetic unit 220, 240 interacting with the second coil conductors 126 in the direction perpendicular to the second direction 14.

The coil conductors 125, 126 of the individual stator segments 120, 121 may each be energized by the drive currents independently from the coil conductors 125, 126 of the remaining stator segments 120, 121. In particular, the drive currents in one of the stator segments 120, 121 do not necessarily depend upon the drive currents in another one of the stator segments 120, 121. In addition, the coil conductors 125, 126 of one of the stator segments 120, 121 may be energized by drive currents, whereas the coil conductors 125, 126 of another, e.g. of an adjacent, stator segment 120, 121 are without current. The coil conductors 125, 126 of the individual stator segments 120, 121 are on the stator assembly 100 electrically isolated from the coil conductors 125, 126 of the remaining stator segments 120, 121. The coil conductors 125, 126 of different stator segments 120, 121 may e.g. be energized by the drive currents from respective separate power modules or from separate current-generating units or, respectively, output stages of a power module of the stator module 10.

The coil conductors 125, 126 in the individual stator sectors 110, 112, 113, 114 may each be switched to form multi-phase systems having a shared neutral point. The neutral point may be embodied on the stator assembly 100.

In particular, the coil-conductors 125, 126 may be connected to form three-phase systems with a shared neutral point. The three-phase systems may each comprise six adjacent first coil conductors 125 or six adjacent second coil conductors 126. The number of adjacent coil conductors 125, 126 in one of the three-phase systems may each amount to three, twelve, or to another multiple of three.

The multi-phase systems may be contactable on the stator assembly 100 in such a way that each of the multi-phase systems may be energized by a drive current independently from the rest of the multi-phase systems. Alternatively, two or more multi-phase systems may each be connected with one another on the stator assembly 100 in such a way that the connected multi-phase systems are each jointly energized by a shared drive current. For example, the connected multi-phase systems on the stator assembly 100 may be connected in series or in parallel.

When interconnecting the coil conductors 125, 126 to result in multi-phase systems, less contacts are required for energizing the coil conductors 125, 126 than in case of separate energizing of the individual coil conductors 125, 126. Thereby, the hardware involved in energization of the first coil conductors 125, 126, in particular the number of current-generating units required for energizing, is reduced.

The stator sectors 110, 112, 113, 114 may, as shown in FIGS. 4 and 5, comprise eighteen coil conductors 125, 126 in each stator layer 104, 105, 106, 107, respectively. Six adjacent coil conductors 125, 126 may each be interconnected to result in a three-phase system and the stator sectors 110, 112, 113, 114 may each comprise three three-phase systems arranged side by side in the first direction 12 and three three-phase systems arranged side by side in the second direction 14. In this context, coil conductors 125, 126 that essentially extend in the same direction 12, 14 and lie on top of one another in the stator layers 104, 105, 106, 107 may be connected in series to result in a shared three-phase system. The coil conductors 125, 126 may be interconnected in such a way that coil conductors 125, 126 arranged on top of one another in the third direction 15 are each energized with the same drive current. The three-phase systems thus have three phases that result from an interconnection from the coil conductors 125, 126 arranged on top of one another in the stator layers 104, 105, 106, 107.

In the individual stator layers 104, 105, 106, 107, for example, all coil conductors 125, 126 lying on top of one another and aligned in parallel may be connected in series. In particular, the first coil conductors 125 of three-phase systems arranged on top of one another, in particular arranged on top of one another in the first stator layer 104 and in the fourth stator layer 107, as well as the second coil conductors 126 of three-phase systems arranged on top of one another, particularly arranged on top of one another in the second stator layer 105 and in the third stator layer 106 may each be connected in series to result in a joint three-phase system. In this context, all coil conductors 125, 126 arranged on top of one another in the third direction 15 and oriented in parallel may be connected in series.

In particular, in the stator assembly 100 within the individual first stator segments 120 the first coil conductors 125 with elongated extension along the first direction 12 are each interconnected to result in multi-phase systems with a shared neutral point. In this context, the individual multi-phase systems of differing first stator segments 120 may respectively be energized independently from each other. In the same manner, all second coil conductors 126 of the individual second stator segments 121 are each interconnected to result in further multi-phase systems. The individual further multi-phase systems of the second stator segments 121 are each independent from one another and may be energized independently from the multi-phase systems of the first stator segments 120. In particular, the first coil conductors 125 of the first stator segments 120 and the second coil conductors 126 of the second stator segments 120 are each interconnected to result in three-phase systems. The first coil conductors 125 and the second coil conductors 126 may each be energized with a three-phase drive current. The drive currents comprise a first U phase, a second V phase and a third W phase that each have a phase shift of 120° with regard to one another.

The stator unit 100 may be embodied as a multi-layer unit wherein the stator layers 104, 105, 106, 107 having the first and second coil conductors 125, 126 are each mechanically connected to one another via isolating intermediate layers. For example, the stator assembly 100 may be a printed circuit or, respectively, a printed circuit board. In particular, the stator assembly 100 may be embodied as a multi-layered circuit board, wherein the stator layers 104, 105, 106, 107 are each arranged in differing layers of the circuit board. The coil conductors 125, 126 may be embodied on the layers of the circuit board as conductor strips having a thickness between 10 µm and 500 µm, in particular a thickness between 50 µm and 250 µm.

The stator assembly 100 may comprise connecting structures in the region of the stator segments 120, 121. The connecting structures may be arranged on the coil conductors 125, 126 or between the coil conductors 125, 126 of the stator segments 120, 121.

The connecting structures may be horizontal connecting structures or vertical connecting structures. The horizontal connecting structures are arranged in one of the stator layers 104, 105, 106, 107 and extend in a plane spread out between the first and second direction 12, 14. The horizontal connecting structures may have an elongated extension. The horizontal connecting structures may, as the coil conductors 125, 126, be embodied as conductor paths or conductor-path sections of a layer of a circuit board of the stator assembly 100.

The horizontal connecting structures may be embodied as parallel connectors and run in parallel to the coil connectors 125, 126 of the stator layer 104, 105, 106, 107 in which they are arranged. For example, horizontal connecting structures embodied as parallel connectors and arranged in a stator layer 104, 107 having first coil conductors 125 have an elongated extension along the first direction 12. Horizontal connecting structures embodied as parallel connectors and arranged in a stator layer 105, 106 having second coil connectors 126 correspondingly have an elongated extension along the second direction 14.

The horizontal connecting structures may also be embodied as cross connectors and run perpendicularly to the coil conductors 125, 126 of the stator layer 104, 105, 106, 107 in which they are arranged. For example, horizontal connecting structures embodied as cross connectors and arranged in a stator layer 104, 107 with first coil conductors 125 have an elongated extension along the direction perpendicular to the first direction 12, i.e. in the stator assembly 100 along the second direction 14. Horizontal connecting structures embodied as cross connectors and arranged in a stator layer 105, 106 with second coil conductors 126 correspondingly have an elongated extension along the direction perpendicular to the second direction 14, i.e. in the stator assembly 100 along the first direction 12.

A part of the connecting structures may be embodied as vertical connecting structures that connect conductor structures, in particular coil conductors 125, 126 or horizontal connecting structures that are arranged on top of one another in the individual stator segments 120, 121 in various stator layers 104, 105, 106, 107. The vertical connecting structures may be embodied as through-contacts or as vias (vertical interconnect access) between the individual stator layers 104, 105, 106, 107 of the circuit board of the stator assembly 100.

In the preceding Figures, the coil conductors 125, 126 are schematically shown as rectangular conductor strips each extending over the entire stator sectors 110, 112, 113, 114. The coil conductors 125, 126 may be embodied in areas of the stator assembly 100 remote from the connecting structures, as is schematically shown in the preceding Figures. Particularly in the region of the connecting structures, the shape of the coil conductors 125, 126 may, however, deviate from the schematic depictions of the preceding Figures. In particular, the first coil conductors 125 of the first stator segments 120 may have a narrower embodiment in the region of the connecting structures in the direction perpendicular to the first direction 12, i.e. the second direction 14 in case of the stator assembly 100, than in the regions remote from the connecting structures. Likewise, the second coil conductors 126 of the second stator segments 121 may have a narrower embodiment in the region of the connecting structures in the direction perpendicular to the second direction 14, i.e. in the first direction 12 in case of the stator assembly 100, than in the regions remote from the connecting structures.

The first coil conductors 125 of the first stator segments 120 may have a shorter embodiment in the first direction 12 than schematically shown in the preceding Figures. The second coil conductors 126 of the second stator segments 121 may have a shorter embodiment in the second direction 14 than is schematically shown in the preceding Figures. In particular, the first coil conductors 125 of the individual first stator segments 120 do not have to respectively fully extend over the first stator segments 120 in the first direction 12 and the second coil conductors 126 of the individual second stator segments 121 do not have to respectively fully extend over the second stator segments 121. Horizontal connecting structures and/or vertical connecting structures may be arranged in the thus resulting free spaces.

Figure 6:
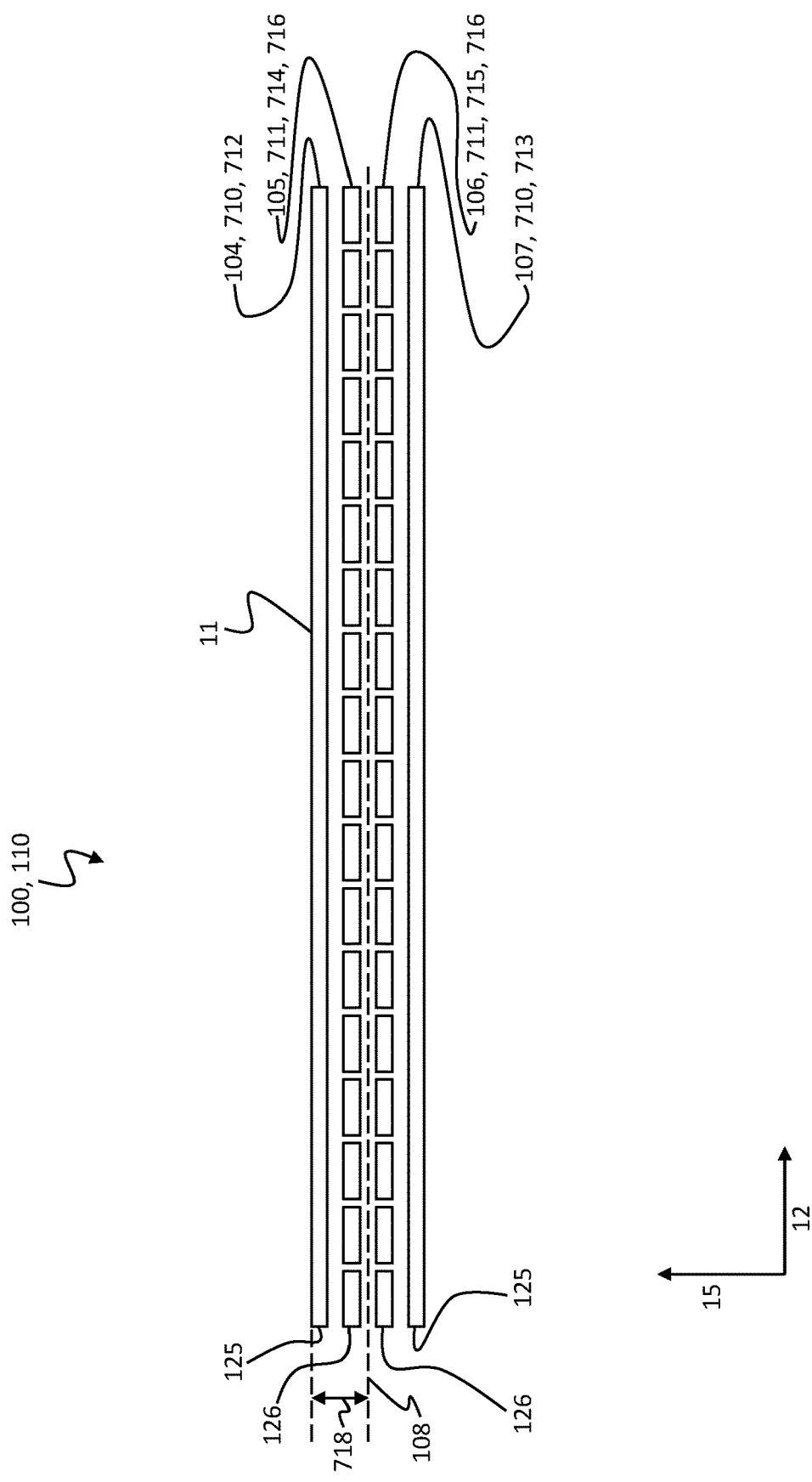
FIG. 6 shows the stator assembly in a sectional view.

FIG. 6 shows a schematic view of the stator assembly 100 of the stator module 10 in a sectional view that is not drawn to scale. The sectional plane is here oriented perpendicularly to the second direction 14. FIG. 6 only shows the coil conductors 125, 126 of the stator layers 104, 105, 106, 107 of the first stator sector 110. The coil conductor 125, 126 and the stator layers 104, 105, 106, 107 of the second, third and fourth stator sector 112, 113, 114 are designed as described for the coil conductors 125, 126 and the stator layers 104, 105, 106, 107 of the first stator sectors 110.

The stator assembly 100 comprises a first arrangement of longitudinal stator layers 710 and a second arrangement of oblique stator layers 711. The longitudinal stator layers 710 are formed by all stator layers 104, 107 of the stator assembly 100 which comprise first coil conductors 125 extending along the first direction 12. The oblique stator layers 711 are formed by all stator layers 105, 106 of the stator assembly 100 that comprise the second coil conductors 126 extending along the second direction 14. The first and second direction 12, 14 may in this context differ from each other and may in particular, as in case of the stator assembly 100, be oriented perpendicularly with regard to each other. The first and second direction 12, 14 may also have a different angle than 90° with regard to each other, e.g.

an angle of 45°. In particular, the first coil conductors 125 of the longitudinal stator layers 710 extending in an elongated manner in the first direction 12 and the second coil conductors 126 of the oblique stator layers 711 extending in an elongated manner in the second direction 14 do not have to be perpendicularly aligned with regard to each other. In the first stator assembly 100, the longitudinal stator layers 710 are formed by the first stator layer 104 and by the fourth stator layer 170, and the oblique stator layers 711 are formed by the second stator layer 105 and the third stator layer 106. The oblique stator layers 711 may in general also be referred to as oblique stator layers.

In the stator assembly 100, a first total number of longitudinal stator layers 710 corresponds to a second total number of oblique stator layers 711. In particular, in the stator assembly 100 the first total number is two and the second total number is two, as well. The longitudinal stator layers 710 and the oblique stator layers 711 are arranged on top of one another in the third direction 15. In addition, the longitudinal stator layers 710 and the oblique stator layers 711 are parallel with regard to each other and aligned perpendicularly with regard to the third direction 15.

The first arrangement of the longitudinal stator layers 710 and the second arrangement of the oblique stator layers 711 have a shared central plane 108. The shared central plane 108 is oriented in parallel to the third direction 15. In the third direction 15, the central plane 108 is centrally arranged between the stator layer of the first arrangement of longitudinal stator layers 710 topmost in the third direction 15 and the stator layer of the first arrangement of longitudinal stator layer 710 lowermost in the third direction 15. Particularly, the central plane 108 is arranged centrally between the first stator layer 104 and the fourth stator layer 107. Moreover, the central plane 108 is centrally arranged in the third direction 15 between the topmost stator layer of the second arrangement of oblique stator layers 711 and the lowermost stator layer of the second arrangement of oblique stator layers 711. In particular, the central plane 108 is centrally arranged between the second stator layer 105 and the third stator layer 106.

The first arrangement of longitudinal stator layers 710 and the second arrangement of oblique stator layers 711 have the same mean distance 718 from the stator surface 11 of the stator assembly 100. The stator surface 11 is arranged at the top side of the first stator layer 104. The mean distance 718 of the longitudinal stator layer 710 refers to the mean value of the distances of the individual longitudinal stator layer 710, i.e. the first and fourth stator layer 104, 107, from the stator surface 11. The mean distance 718 of the oblique stator layers 711 refers to the mean value of distances of the individual oblique stator layers 711, i.e. the second and third stator layer 105, 106 from the stator surface 11. In the stator assembly 100, the mean distance 718 of the longitudinal stator layers 710 corresponds to half of the distance between the surfaces of the first and fourth stator layer 104, 107. The mean distance of the oblique stator layers 711 corresponds to half the distance between the surfaces of the second and third stator layer 105, 106.

The first arrangement of longitudinal stator layers 710 is in the third direction 15 arranged symmetrically to the shared central plane 108. This means that the longitudinal stator layers 710 are in the third direction 15 symmetrically positioned or arranged with regard to the central plane 108. In particular, the longitudinal stator layers 710 arranged above the central plane 108 in the third direction 15 and the longitudinal stator layers 710 arranged below the central plane 108 in the third direction 15 are in the third direction 15 arranged opposite to each other in pairs.

The second arrangement of oblique stator layers 711 is in the third direction 15 arranged symmetrically to the shared central plane 108. This means that the oblique stator layers 711 are in the third direction 15 positioned or arranged symmetrically to the central plane 108. In particular, the oblique stator layer 711 arranged above the central plane 108 in the third direction 15 and the oblique stator layers 711 arranged below the central plane 108 in the third direction 15 are in the third direction 15 arranged opposite to each other in pairs. In the stator assembly 100, a distance of the shared central plane 108 from the stator surface 11 corresponds to the mean distance 718 of the longitudinal stator layers 710 and the oblique stator layers 711 from the stator surface 11.

While the first arrangement of longitudinal stator layers 710 and the second arrangement of oblique stator layers 711 are symmetrical with regard to the central plane 108, the longitudinal stator layers 710 and the oblique stator layers 711 themselves do not have to be symmetrical with regard to the central plane 108. In particular, longitudinal stator layers 710 and oblique stator layers 711 opposite to each other in the third direction 15 with regard to the central plane 108 be embodied differently from each other. In particular, the longitudinal stator layer 710 opposite to each other and the oblique stator layers 711 opposite to each other may each have differing arrangements of coil conductors 125, 126, horizontal connecting structures and/or vertical connecting structures.

The stator assembly 100 comprises a topmost stator layer 712 and a lowermost stator layer 713. The topmost stator layer 712 is in the third direction 15 located above all other stator layers 710, 711 and the lowermost stator layer 713 is in the third direction 15 located below all other stator layers 710, 711. All other stator layers 710, 711 of the stator assembly 100 are in the third direction 15 arranged between the topmost stator layer 712 and the lowermost stator layer 713 so that the topmost stator layer 712 and the lowermost stator layer 713 form the outer layers of the stator assembly 100. The topmost stator layer 712 and the lowermost stator layer 713 are each embodied as longitudinal stator layers 710 having first coil conductors 125. In the stator assembly 100, the topmost stator layer 712 is formed by the first stator layer 104 and the lowermost stator layer 713 is formed by the fourth stator layer 107. All stator layers arranged between the topmost stator layer 712 and the lowermost stator layer 713 of the stator assembly 100, particularly the second and third stator layer 105, 106, form interior layers 716 of the stator assembly 100.

The stator assembly 100 in addition comprises a second topmost stator layer 714 and a second lowermost stator layer 715. The second topmost stator layer 714 is arranged beside the topmost stator layer 712 and is in the third direction 15 located below the topmost stator layer 712. The second lowermost stator layer 712 is arranged beside the lowermost stator layer 713 and is in the third direction 15 located above the lowermost stator layer 713. The second topmost stator layer 714 and the second lowermost stator layer 715 are each embodied as oblique stator layers 711 comprising the second coil conductors 126. In the stator assembly 100, the second topmost stator layer 714 is formed by the second stator layer 105 and the second lowermost stator layer 715 is formed by the third stator layer 106.

Figure 7:
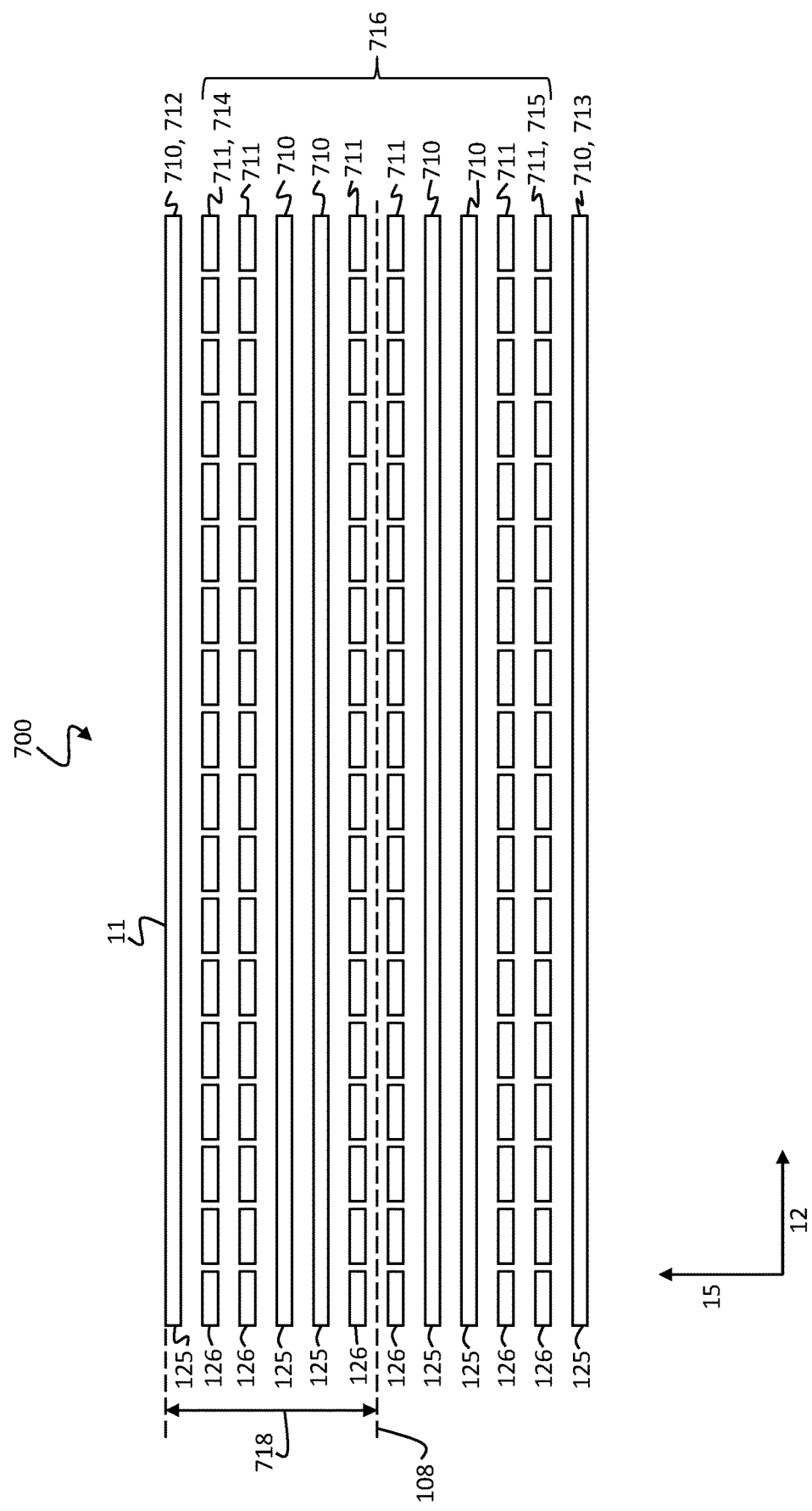
FIG. 7 shows a first further stator assembly for the stator module in a sectional view.

FIG. 7 shows a schematic view (not drawn to scale) of a first further stator assembly 700 of the stator module 10 in a sectional view in which the sectional plane is oriented perpendicularly to the second direction 14. To the extent that no differences are described, the first further stator assembly 700 is embodied as described for stator assembly 100. In the first further stator assembly 100, the first direction 12 is in particular oriented perpendicularly to the second direction 14.

The first further stator assembly 700 comprises a total of twelve stator layers. Six stator layers are embodied as longitudinal stator layers 710 having first coil conductors 125 and six stator layers are embodied as oblique stator layers 711 having second coil conductors 126. The longitudinal stator layers 710 and the oblique stator layers 711 have the same mean distance 718 from the stator surface 11 of the first further stator assembly 700 in the third direction 15. The longitudinal stator layers 710 and the oblique stator layers 711 are in the third direction 15 arranged symmetrically to the shared central plane 108. The topmost stator layer 712 and the lowermost stator layer 713 are embodied as longitudinal stator layers 710 and the second topmost stator layer 714 and the second lowermost stator layer 715 are embodied as oblique stator layers 711.

The first further stator assembly 700 comprises inner layers 716 that are arranged within the first further stator assembly 700. The inner layers 716 are in the third direction 15 particularly arranged between the outer layers of the first further stator assembly 700, i.e. between the topmost and the lowermost stator layer 712, 713. The inner layers 716 are in the third direction 15 alternatingly embodied as two respectively adjacent longitudinal stator layers 710 and as two adjacent oblique stator layers 711. In the first further stator assembly 700, at first two oblique stator layers 711, then two longitudinal stator layers 710, then two oblique stator layers 711, then two longitudinal stator layers 710 and then two oblique stator layers 711 are arranged below the topmost stator layer 712 embodied as longitudinal stator layer 710 as inner layers 716 above the lowermost stator layer 713 embodied as longitudinal stator layer 710.

Alternative embodiments of the first further stator assembly 700 may also comprise less than twelve stator layers or more than twelve stator layers. Particularly, alternative embodiments of the first further stator assembly 700 may comprise eight stator layers, wherein between a topmost stator layer 712 embodied as a longitudinal stator layer 710 and a lowermost stator layer 713 embodied as a longitudinal stator layer 710 two oblique stator layers 711, two longitudinal stator layers 710 and two oblique stator layers 711 may be arranged as inner layers 716.

Figure 8:
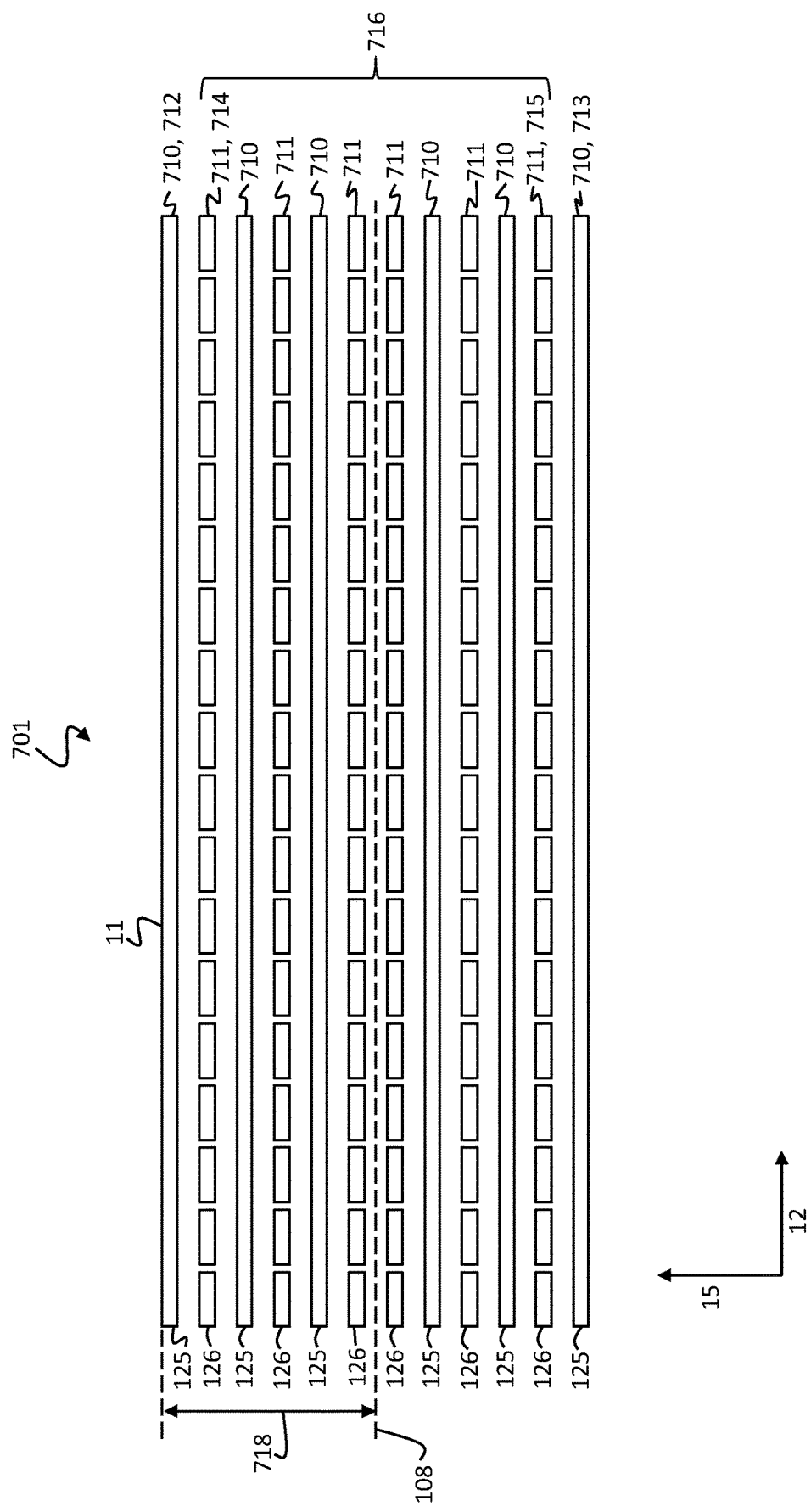
FIG. 8 shows a second further stator assembly for the stator module in a sectional view.

FIG. 8 shows a schematic sectional view of a second further stator assembly 701 in which the sectional plane is oriented perpendicularly to the second direction 14. To the extent that no differences are described in the following, the second further stator assembly 701 is embodied as described for the first further stator assembly 700. The stator module 10 may comprise the second further stator assembly 701 instead of the stator assembly 100.

The second further stator assembly 701 comprises a total of twelve stator layers. Six stator layers are longitudinal stator layers 710 having first coil conductors 125 and six stator layers are oblique stator layers 711 having second coil conductors 126. The longitudinal stator layers 710 and the oblique stator layers 711 have the same mean distance 718 from the stator surface 11 of the second further stator assembly 701 in the third direction 15. The longitudinal stator layers 710 and the oblique stator layers 711 are in the third direction 15 arranged symmetrically with regard to the shared central plane 108. The topmost stator layer 712 and the lowermost stator layer 713 are embodied as longitudinal stator layers 710 and the second topmost stator layer 714 and the second lowermost stator layer 715 are embodied as oblique stator layers 711.

In the second further stator assembly 701, the inner layers 716 arranged between the topmost stator layer 712 and the central plane 108 are each alternatingly embodied as oblique stator layers 711 and longitudinal stator layers 710. In addition, the inner layers 716 arranged between the central plane 108 and the lowermost stator layer 113 are each alternatingly embodied as oblique stator layers 711 and longitudinal stator layers 710. The two stator layers directly adjacent to the central plane 108 are each embodied as oblique stator layers 711. In the second further stator assembly 701, a longitudinal stator layer 710, an oblique stator layer 711, a longitudinal stator layer 710, an oblique stator layer 711, a longitudinal stator layer 710, an oblique stator layer 711, an oblique stator layer 711, a longitudinal stator layer 710, an oblique stator layer 711, a longitudinal stator layer 710, an oblique stator layer 711, and a longitudinal stator layer 710 are, in this order, arranged on top of one another in the first direction 15.

Figure 9:
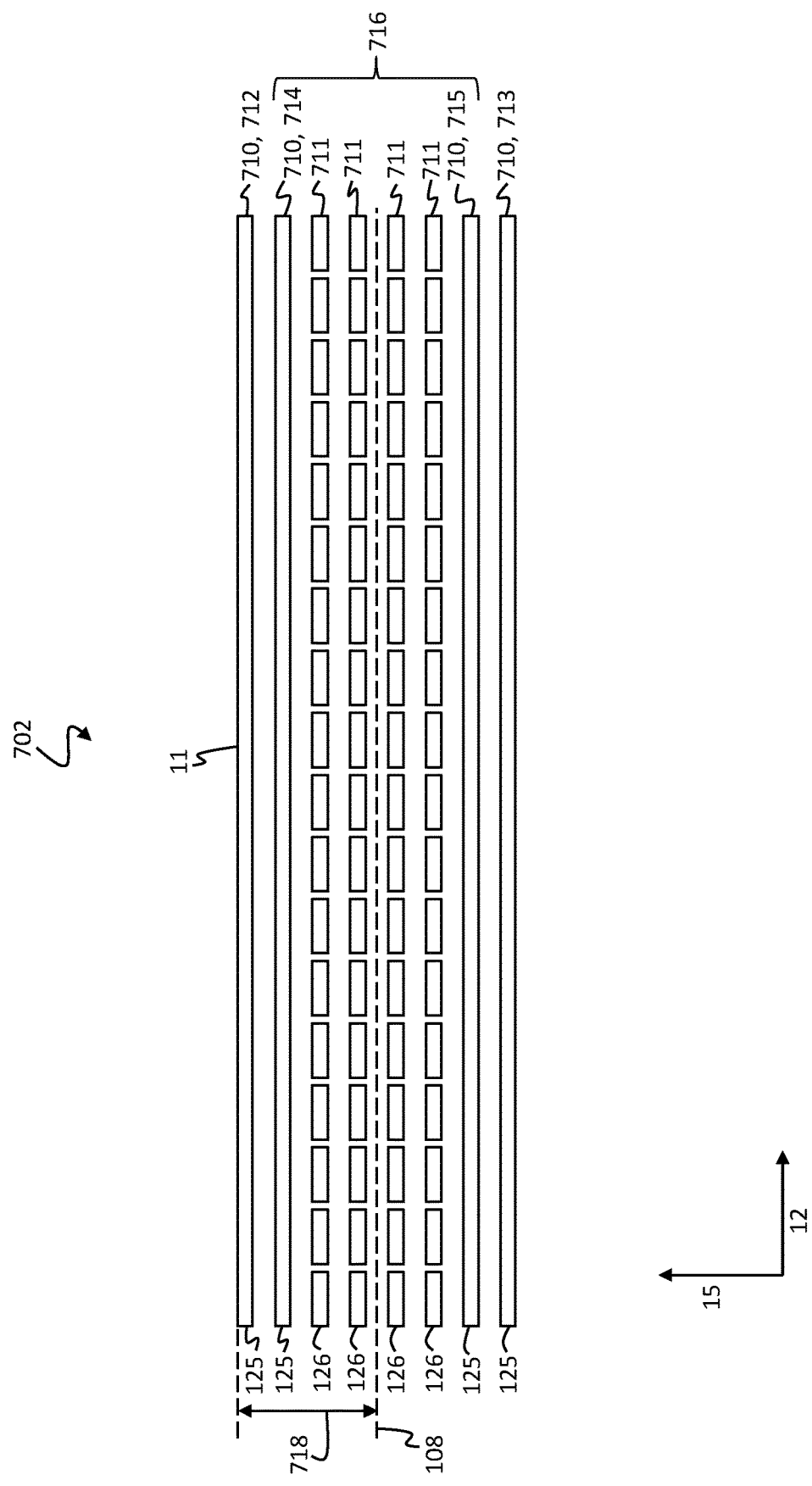
FIG. 9 shows a third further stator assembly for the stator module in a sectional view.

FIG. 9 shows a schematic sectional view (not drawn to scale) of a third further stator assembly 702 in which the sectional plane is oriented perpendicularly to the second direction 14. To the extent that no differences are described, the third further stator assembly 702 is embodied as described for the first further stator assembly 700. The stator module 10 may comprise the third further stator assembly 702 instead of the stator assembly 100.

The third further stator assembly 702 comprises a total of eight stator layers. Four stator layers are embodied as longitudinal stator layers 710 having first coil conductors 125 and four stator layers are embodied as oblique stator layers 711 having second coil conductors 126. The longitudinal stator layers 710 and the oblique stator layers 711 have the same mean distance 718 from the stator surface 11 of the third further stator assembly 702 in the third direction 15. The longitudinal stator layers 710 and the oblique stator layers 711 are in the third direction 15 arranged symmetrically to the shared central plane 108. The topmost stator layer 712 and the lowermost stator layer 713 are embodied as longitudinal stator layers 710.

In the third further stator assembly 702, the second topmost stator layer 714 and the second lowermost stator layer 715 are embodied as longitudinal stator layers 710, as well. Between the second lowermost stator layer 715 and the second topmost stator layer 714, four stator layers are arranged that are each embodied as oblique stator layers 711. In the third further stator assembly 702, two longitudinal stator layers 710, four oblique stator layers 711 and two longitudinal stator layers 710 are thus arranged on top of one another in the third direction 15.

In the stator assembly 100 and the first, second and third further stator assembly 700, 701, 702, the two stator layers adjacent to the central plane 108, i.e. the stator layer arranged above the central plane 108 in the third direction 15 and the stator layer arranged below the central plane 108 in the third direction 15 are each embodied as oblique stator layers 711. In alternative embodiments of the stator assemblies 100, 700, 701, 702, the stator layers adjacent to the central plane 108 may also be embodied as longitudinal stator layers 710.

Figure 10:
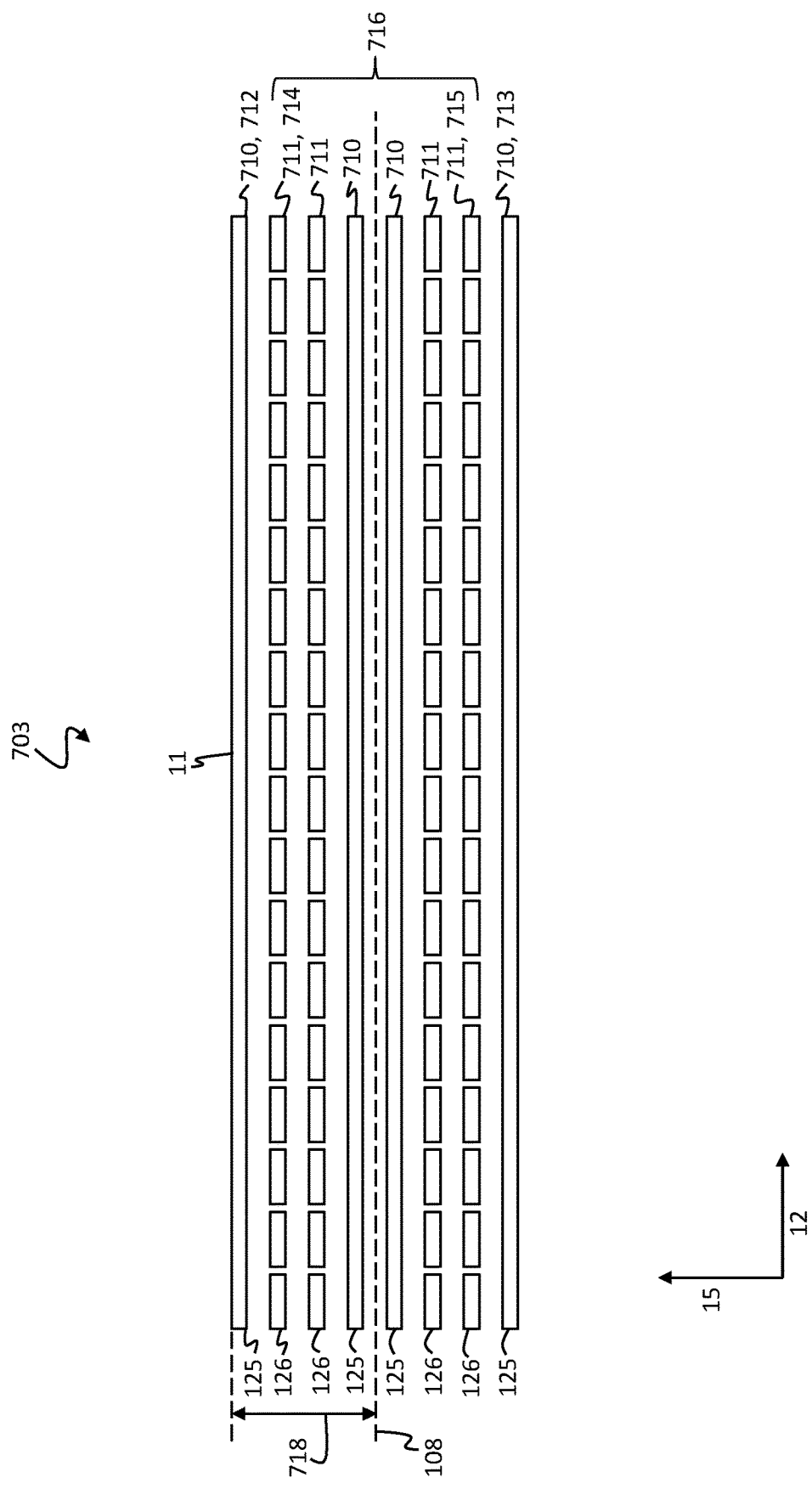
FIG. 10 shows a fourth further stator assembly for the stator module in a sectional view.

FIG. 10 shows a schematic sectional view (not drawn to scale) of a fourth further stator assembly 703, in which the sectional plane is oriented perpendicularly to the second direction 14. To the extent that no differences are described, the fourth further stator assembly 703 is embodied as described for the first further stator assembly 700. The stator module 10 may comprise the fourth further stator assembly 703 instead of the stator assembly 100.

The fourth further stator assembly 703 comprises a total of eight stator layers. Four stator layers are embodied as longitudinal stator layers 710 having first coil conductors 125 and four stator layers are oblique stator layers 711 having second coil conductors 126. The longitudinal stator layers 710 and the oblique stator layers 711 have the same mean distance 718 from the stator surface 11 of the fourth further stator assembly 703 in the third direction 15. The longitudinal stator layers 710 and the oblique stator layers 711 are arranged symmetrically to the shared central plane 108 in the third direction 15. The topmost stator layer 712 and the lowermost stator layer 713 are longitudinal stator layers 710 and the second topmost stator layer 714 and the second lowermost stator layer 715 are oblique stator layers 711. The inner layers 716 are in the third direction 15 alternatingly each embodied as two adjacent longitudinal stator layers 710 and as two adjacent oblique stator layers 711.

In the fourth further stator assembly 703, the stator layers adjacent to the central plane 108 are each embodied as longitudinal stator layers 710. In the fourth further stator assembly 703, a longitudinal stator layer 710, two oblique stator layers 711, two longitudinal stator layers 710, two oblique stator layers 711 and a longitudinal stator layer 710 are in this order arranged on top of one another in the third direction 15.

In the stator assembly 100 and in the first, second, third and fourth stator assembly 700, 701, 702, 703, the distance of the shared central plane 108 from the stator surface 11 corresponds to the mean distance 718 of the first arrangement of longitudinal stator layers 710 and to the mean distance 718 of the second arrangement of oblique stator layers 711 from the stator surface 11. In alternative embodiments of the stator assemblies 100, 700, 701, 702, 703, the distance of the central plane 108 from the stator surface 11 and the mean distance 718 of the stator layers 710, 711 from the stator surface 11 may differ.

Figure 11:
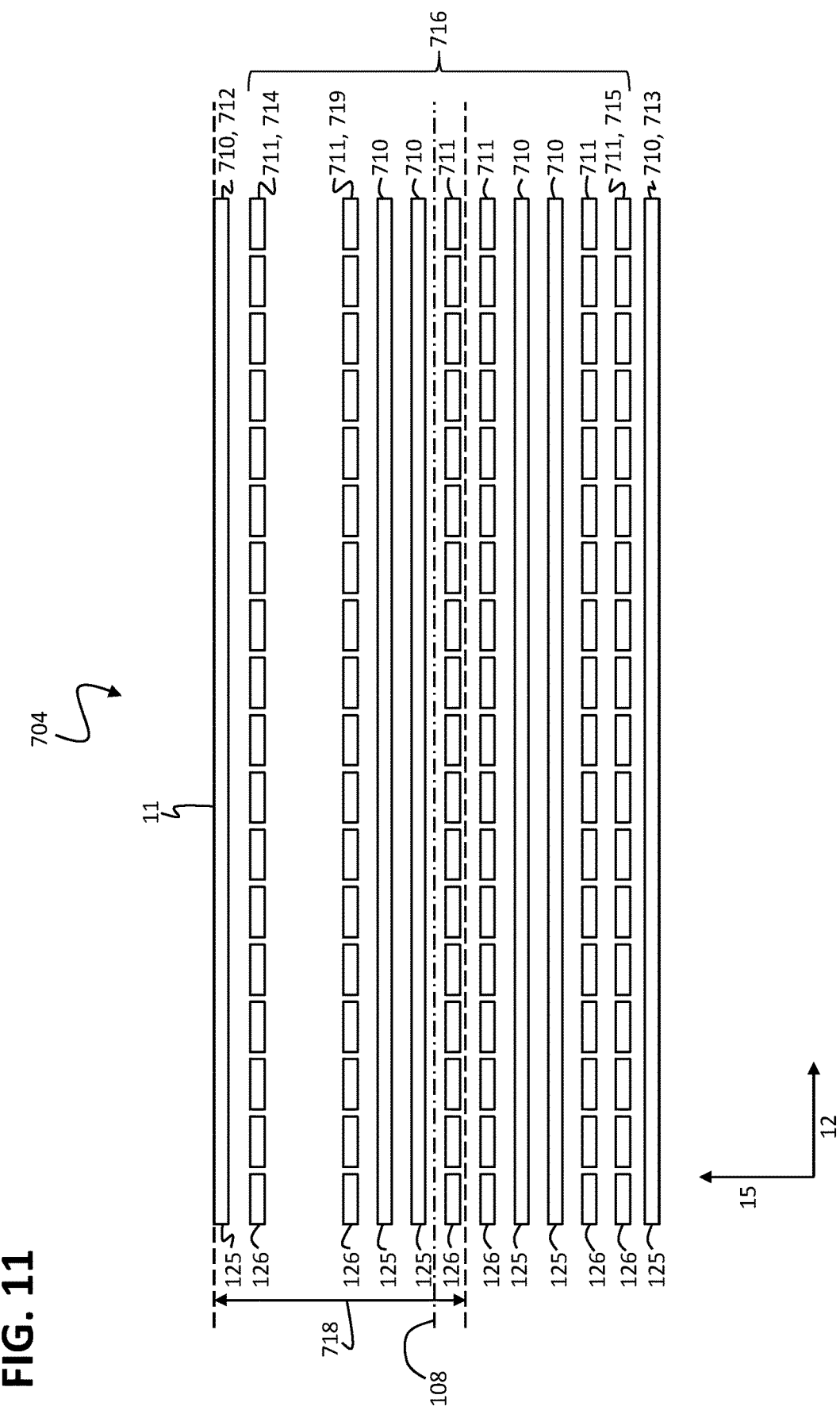
FIG. 11 shows a fifth further stator assembly for the stator module in a sectional view.

FIG. 11 shows a schematic sectional view (not drawn to scale) of a fifth further stator assembly 704, in which the sectional plane is oriented perpendicularly to the second direction 14. To the extent that no differences are described, the fifth further stator assembly 704 is embodied as described for the first further stator assembly 700. The stator module 10 may comprise the fifth further stator assembly instead of the stator assembly 100.

The fifth further stator assembly 704 comprises a total of twelve stator layers. Six stator layers are longitudinal stator layers 710 having first coil conductors 125 and six stator layers are oblique stator layers 711 having second coil conductors 126. The topmost stator layer 712 and the lowermost stator layer 713 are embodied as longitudinal stator layers 710 and the second topmost stator layer 714 and the second lowermost stator layer 715 are embodied as oblique stator layers 711. The order of the arrangement of the longitudinal stator layers 710 and of the oblique stator layers 711 in the third direction 15 corresponds to the order of the arrangement of the longitudinal stator layers 710 and of the oblique stator layers 711 in the first further stator assembly 700 according to FIG. 7.

In the stator assembly 100 and in the first, second, third and fourth further stator assembly 700, 701, 702, 703, all adjacent stator layers 710, 711 are arranged at the same distance with regard to each other. In the fifth further stator assembly 704, at least one of the oblique stator layers 711 or at least one of the longitudinal stator layers 710 has a different distance from an adjacent stator layer than the other stator layers. In particular in the fifth further stator assembly 704, the second topmost stator layer 714 arranged below the topmost stator layer 712 has a distance from the next lower stator layer 719 that differs from the distances between the rest of the stator layers. The distance between the second topmost stator layer 714 and the next lower stator layer 719 may, as depicted, be larger than the distances of the other stator layers, however, it may also be smaller. In alternative embodiments of the fifth further stator assembly 704, a distance between two other adjacent stator layers as well as between the second topmost stator layer 714 and the next lower stator layer 719 may differ from the distances of the rest of the adjacent stator layers.

In the fifth further stator assembly 704, the first arrangement of the longitudinal stator layers 710 and the second arrangement of oblique stator layers 711 have a shared central plane 108. In particular, the shared central plane 108 is arranged centrally between the longitudinal stator layer 710 lowermost in the third direction 15, i.e. the lowermost stator layer 713, and the longitudinal stator layer 710 topmost in the third direction 15, i.e. the topmost stator layer 712, as well as centrally between the oblique stator layer 711 lowermost in the third direction 15, i.e. the second lowermost stator layer 715, and the oblique stator layer 711 topmost in the third direction 15, i.e. the second topmost stator layer 714. In the fifth further stator layer 704, the first arrangement of the longitudinal stator layers 710 is embodied unsymmetrically to the shared central plane 108, in particular unsymmetrically to the central plane of the first arrangement of longitudinal stator layers 710. Moreover, the second arrangement of oblique stator layers 711 is embodied unsymmetrically with regard to the shared central plane 108, in particular unsymmetrically with regard to the central plane of the second arrangement of oblique stator layers 711.

In the fifth further stator assembly 704, the longitudinal stator layers 710 and the oblique stator layers 711 have the same mean distance 718 from the stator surface 11 of the fifth further stator assembly 704 in the third direction 15. The mean distance 718 is larger than the distance between the stator surface 11 and the shared central plane 108. In alternative embodiments of the fifth further stator assembly 704, the mean distance 718 may also be smaller than the distance between the stator surface 11 and the shared central plane 108.

In the stator assemblies 100, 700, 701, 702, 703, 704, a first total number of longitudinal stator layers 710 and a second total number of oblique stator layers 711 are the same, i.e. the stator assemblies 100, 700, 701, 702, 703, 704 each comprise the same number of longitudinal stator layers 710 and oblique stator layers 711. In alternative embodiments of the stator assemblies 100, 700, 701, 702, 703, 704, the first total number and the second total number may also differ and the stator assemblies 100, 700, 701, 702, 703, 704 may comprise more longitudinal stator layers 710 than oblique stator layers 711, or vice versa.

Figure 12:
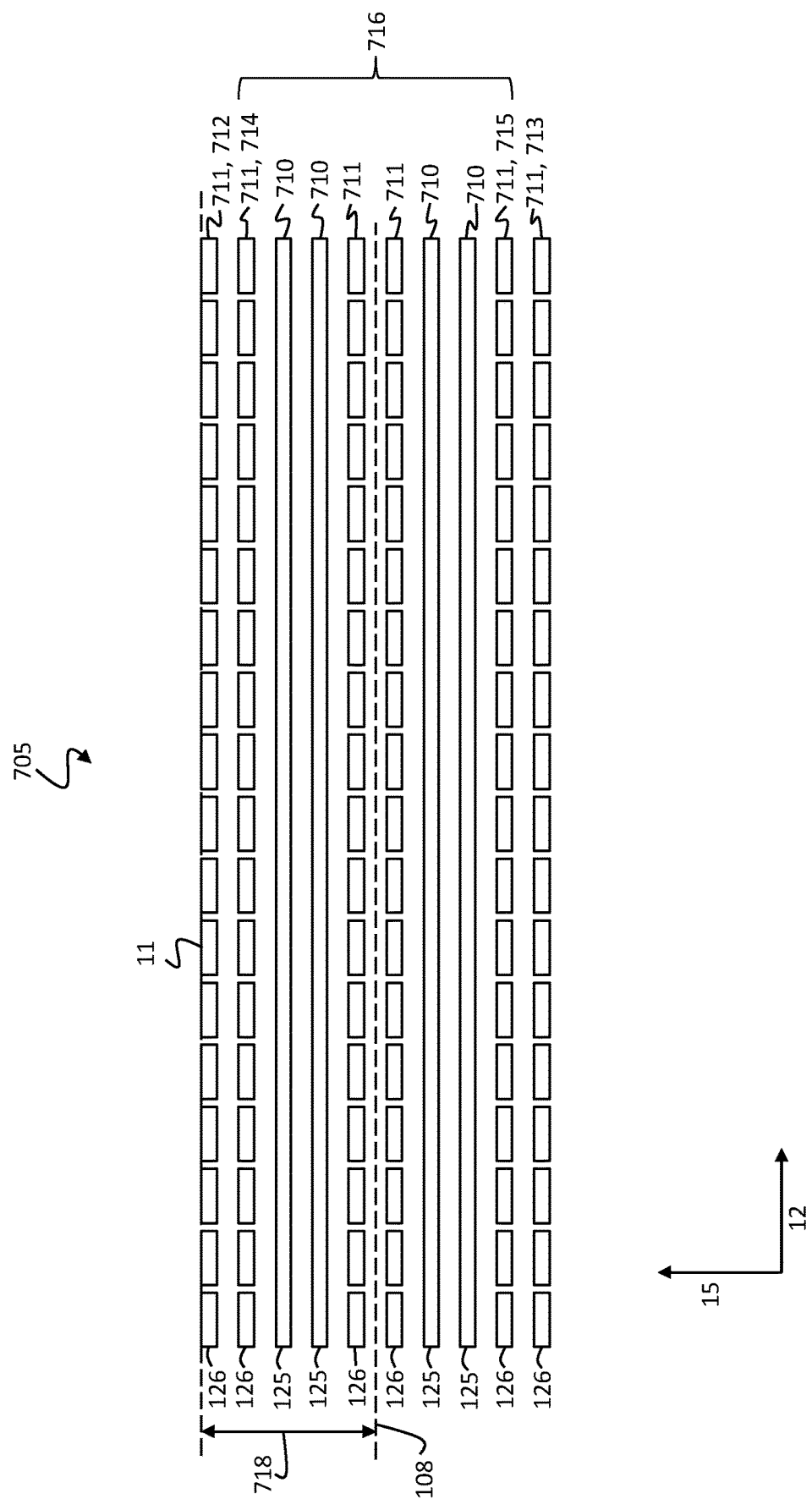
FIG. 12 shows a sixth further stator assembly for the stator module in a sectional view.

FIG. 12 shows a schematic sectional view of a sixth further stator assembly 705 of the stator module 10, in which the sectional plane is oriented perpendicularly to the second direction 14. To the extent that no differences are described in the following, the sixth further stator assembly 705 is embodied as described for the first further stator assembly 700. The stator module 10 may comprise the sixth further stator assembly 705 instead of the stator assembly 100.

The longitudinal stator layers 710 and the oblique stator layers 711 in the third direction 15 comprise the same mean distance 718 from the stator surface 11 of the sixth further stator assembly 705. The longitudinal stator layers 710 and the oblique stator layers 711 are in the third direction 15 arranged symmetrically to the shared central plane 108. In the sixth further stator assembly 705, two oblique stator layers 711 and two longitudinal stator layers 710 are respectively arranged on top of one another in an alternating manner in the third direction 15. In the sixth further stator assembly 705, this includes the outer layers as well as the inner layers 716. In particular, in the sixth further stator assembly 705 the topmost stator layer 712 and the lowermost stator layer 713 as well as the second topmost stator layer 714 and the second lowermost stator layer 715 are embodied as oblique stator layers 711.

In the sixth further stator assembly 705, the first total number of longitudinal stator layers 710 and the second total number of oblique stator layers 711 are not equal, in particular the first total number is smaller than the second total number. The sixth further stator assembly 705 in total comprises ten stator layers. Six stator layers are embodied as oblique stator layers 711 and four stator layers are embodied as longitudinal stator layers 710. In alternative embodiments of the sixth further stator assembly 705, the first total number may be larger than the second total number.

In the sixth further stator assembly 705, the stator layers adjacent to the central plane 108 are each embodied as oblique stator layers 711. In the sixth further stator assembly 705, two oblique stator layers 711, two longitudinal stator layers 710, two oblique stator layers 722, two longitudinal stator layers 710 and two oblique stator layer 711 are arranged on top of one another in that order.

In the sixth further stator assembly 705, the stator layers each have the same distance from one another. The shared central plane 108 is arranged centrally between the topmost stator layer 712 and the lowermost stator layer 713. The distance of the shared central plane 108 from the stator surface 11 thus also corresponds to the mean distance 718 of the longitudinal stator layer 710 and the oblique stator layer 711 from the stator surface 11.

The stator assemblies 100, 700, 701, 702, 703, 704, 705 may comprise a plurality of two-layer circuit boards arranged on top of one another. The two-layer circuit boards may each comprise a first and a second conductor-path layer which is arranged at a first side and at a second side of the circuit board and between which an isolating intermediate layer is arranged. The first conductor-path layer may be connected to the second conductor-path layer in an electrically conductive manner via through-contacts which are guided through the isolating intermediate layer. The through-contacts may e.g. be conductively coated throughholes in the intermediate layer. In this context, the through-contacts can only extend over the very circuit board on which the conductor-path layers connected via the relevant through-contacts are arranged; however, they cannot extend over the entire stator assembly 100, 700, 701, 702, 703, 704, 705. Such through-contacts of a circuit board consisting of a plurality of two-layer circuit boards are also referred to as buried vias.

The two-layer circuit boards may be arranged on top of one another and be glued or pressed to one another so that the stator assembly 100, 700, 701, 702, 703, 704, 705 altogether comprises a multi-layer circuit board having an even number of conductor-path layers.

Figure 13:
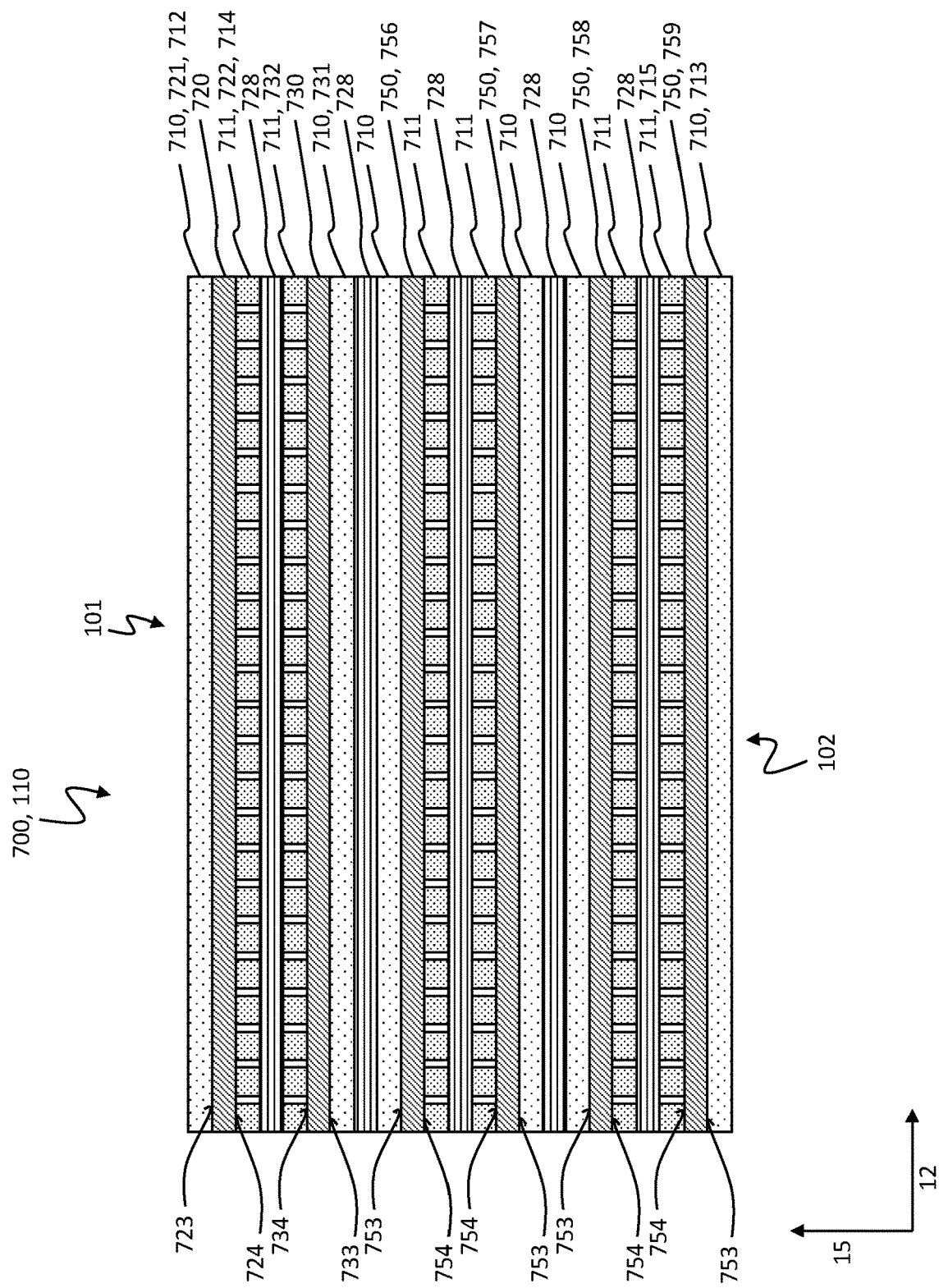
FIG. 13 shows the first further stator assembly in a further sectional view.

FIG. 13 shows a further schematic sectional view (not drawn to scale) of the first further stator assembly 700, wherein the sectional plane is perpendicular to the second direction 14.

The first further stator assembly 700 comprises a first carrier plate 720 and a second carrier plate 730. To the extent that no differences are described, the second carrier plate 730 is embodied as described for the first carrier plate 720.

The first carrier plate 720 has a plate shape in the first direction 12 and in the second direction 14, in particular a plate shape extending in the first and second direction 12, 14. The first carrier plate 720 extends in the first direction 12 and in the second direction 14 and comprises a lower extension in the third direction 15 than in the first direction 12 and in the second direction 14. In the first direction 12, the first carrier plate 720 extends between the side faces 32 of the first further stator assembly 700 oriented along the second direction 14. In the second direction 14, the first carrier plate 720 extends between the side faces 32 of the first further stator assembly 700 oriented along the first direction 12.

The first carrier plate 720 has a two-layer embodiment, i.e. it comprises two stator layers of the first further stator assembly 700. The first carrier plate 720 comprises a first side 723 and a second side 724 opposite to the first side 723 in the third direction 15. On the first side 723 of the first carrier plate 720, a longitudinal stator layer 710 of the first further stator assembly 700 referred to as first longitudinal stator layer 721 is arranged with first coil conductors 125. On the second side 724 of the first carrier plate 720, an oblique stator layer 711 of the first further stator assembly 700 referred to as first oblique stator layer 722 is arranged with second coil conductors 126. The first side 723 of the first carrier plate 720 and the second side 724 of the first carrier plate 720 are each embodied in a plane manner and arranged in parallel to each other.

The first carrier plate 720 comprises an electrically isolating material, e.g. a ceramic material, a plastic material or a glass-fiber-reinforced plastic material. The first longitudinal stator layer 721 having first coil conductors 125 and the first oblique stator layer 722 having second coil conductors 126 are embodied as flat and electrically conductive layers, e.g. metallic layers, in the third direction 15.

The first carrier plate 720 may be a circuit board, in particular a printed circuit board, and the first longitudinal stator layer 721 and the first oblique stator layer 722 may be embodied as conductor-path layers of the circuit board. The first coil conductor 125 of the first longitudinal stator layer 721 and the second coil conductor 126 of the first oblique stator layer 722 may be embodied as conductor strips with an elongated extension having a thickness between 10 µm and 500 µm on the sides 723, 724 or on the layers of the first carrier plate 720, in particular the conductor strips may have a thickness between 50 µm and 250 µm. The first coil conductors 125 of the first longitudinal stator layer 721 and the second coil conductors 126 of the second oblique stator layer 722 may also be embodied as metal strips or metal wires.

The second carrier plate 730 is embodied as described for the first carrier plate 720. In particular, the second carrier plate 730 comprises a first side 733 and a second side 734 opposite to the first side 733 of the second carrier plate 730 in the third direction 15. On the first side 733 of the second carrier plate 730, a longitudinal stator layer 710 referred to as second longitudinal stator layer 731 having first coil conductors 125 is arranged and on the second side 734 of the second carrier plate 733, an oblique stator layer 711 referred to as second oblique stator layer 732 having second coil conductors 126 is arranged. In analogy to the first carrier plate 720, the second carrier plate 730 may be embodied as a circuit board, in particular as a printed circuit board, and the second longitudinal stator layer 731 and the first oblique stator layer 732 may be embodied as conductor-path layers of the circuit board.

The first carrier plate 720 is aligned in such a way that the first side 723 of the first carrier plate is in the third direction 15 located above the second side 724 of the first carrier plate 720. Thus, the first side 723 of the first carrier plate 720 forms the upper side of the first carrier plate 720 in the third direction 15 and the second side 724 of the first carrier plate 720 forms the bottom surface of the first carrier plate 720 in the third direction 15. The second carrier plate 730 is aligned in such a way that the first side 733 of the second carrier plate 730 is in the third direction 15 below the second side 734 of the second carrier plate 730. Thus, the first side 733 of the second carrier plate 730 forms the bottom surface of the second carrier plate 730 in the third direction 15 and the second side 734 of the second carrier plate 730 forms the upper side of the second carrier plate 730 in the third direction 15.

The first carrier plate 720 and the second carrier plate 730 of the first further stator assembly 700 are arranged side-by-side in the third direction 15. The first carrier plate 720 and the second carrier plate 730 are aligned in parallel to each other. The first carrier plate 720 is arranged above the second carrier plate 730 in the third direction. In particular, the second side 724 of the first carrier plate 720 is arranged facing the second side 734 of the second carrier plate 730. The first side 723 of the first carrier plate 720 in the third direction 15 forms an upper side 101 of the first further stator assembly 700.

In the first further stator assembly 700, the first longitudinal stator layer 721 forms the first stator layer 104 of the first further stator assembly 700. The first oblique stator layer 722 forms the second stator layer 105, the second oblique stator layer 732 forms the third stator layer 106 and the second longitudinal stator layer 731 forms the fourth stator layer 107 of the first further stator assembly 700.

An isolating layer 728 is arranged between the first carrier plate 720 and the second carrier plate 730. The isolating layer 728 is embodied in an electrically isolating manner. The isolating layer 728 may e.g. comprise plastic or a ceramic material. The isolating layer 728 may in the first direction 12 extend between the side faces 32 of the first further stator assembly 700 running along the second direction 14 and in the second direction 14 between the side faces 32 of the first further stator assembly 700 running along the first direction 12. The isolating layer 728 and the carrier plate 720, 730 may have the same thickness in the third direction 15. The thickness of the carrier plate 720, 730 and of the isolating layer 728 may in the third direction e.g. be between 35 μm and 200 μm, in particular between 50 μm and 100 μm, in particular amount to 75 μm. However, the isolating layer 728 may also have a lower or larger thickness in the third direction 15 than the carrier plates 720, 730.

The isolating layer 728 is firmly mechanically connected to the first carrier plate 720 and to the second carrier plate 730. The isolating layer 728 may for example be glued to the carrier plates 720, 730. Alternatively or additionally, a connecting element may extend through the first further stator assembly 700 in the third direction 15 and mechanically connect the carrier plates 720, 730 and the isolating layer 728. The connecting element may for example extend from the upper side 101 of the first further stator assembly 700 to the bottom surface 102 of the stator assembly 700. The connecting element may for example extend from the first side 723 of the first carrier plate 720 to the first side 733 of the second carrier plate 730. The connecting element may for example be embodied as a press-fit connector. Apart from the connecting element, the first further stator assembly 700 may comprise further connecting elements of identical embodiment.

Apart from the first and second carrier plate 720, 730, the first further stator assembly 700 comprises four further carrier plates 750. To the extent that no differences are described, the further carrier plates 750 are embodied and arranged as described for the first and second carrier plate 720, 730. In particular, the further carrier plates 750 each comprise a first side 753 having a longitudinal stator layer 710 and a second side 754 having an oblique stator layer 711. The carrier plates 720, 730, 750 of the first further stator assembly 700 are in the third direction 15 arranged on top of one another and in parallel with regard to one another. In this context, the first sides 723, 733, 753 and the second sides 724, 734, 754 of adjacently arranged carrier plates 720, 730, 750 are in the third direction 15 each alternatingly arranged facing each other.

In the first further stator assembly 700, the first carrier plate 720 is arranged as the topmost carrier plate in the third direction 15 above the rest of the carrier plates 730, 750. The first longitudinal stator layers 721 forms the topmost stator layer 712 and the first oblique stator layer 722 forms the second topmost stator layer 714 of the first further stator assembly 700. The first side 723 of the first carrier plate 720 forms an upper side 101 of the first further stator assembly 700.

In the third direction 15 below the first carrier plate 720, the second carrier plate 730, a first further carrier plate 756, a second further carrier plate 757, a third further carrier plate 758 and a fourth further carrier plate 759 are arranged one after the other. The first side 733 of the second carrier plate 730 is arranged facing the first side 753 of the first further carrier plate 756, the second side 754 of the first further carrier plate 756 is arranged facing the second side 754 of the second further carrier plate 575, the first side 753 of the second further carrier plate 757 is arranged facing the first side 753 of the third further carrier plate 758 and the second side 754 of the third further carrier plate 758 is arranged facing the second side 754 of the fourth further carrier plate 759. The first side 753 of the fourth further carrier plate 759 forms the bottom surface 102 of the first further stator assembly 700.

An isolating layer 728 is respectively arranged between the carrier plates 720, 730, 750, which is embodied as the isolating layer 728 arranged between the first and second carrier plate 720, 730.

The first further stator assembly 700 in total comprises a multi-layer stator-layer arrangement with an even number of stator layers. The first further stator assembly 700 in particular comprises a twelve-layer stator-layer arrangement. The first further stator assembly 700 comprises a plurality of two-layer carrier plates 720, 730, 750 arranged on top of one another in the third direction 15. In particular, the first further stator assembly 700 comprises six two-layer carrier plates 720, 730, 750 arranged on top of one another in the third direction 15.

In the first further stator assembly 700, an oblique stator layer 711 is in the third direction 15 arranged beside each longitudinal stator layer 710 and a longitudinal stator layer 710 beside each oblique stator layer 711 inside of the stator assembly 700, i.e. with the exception of the topmost stator layer 712 and the lowermost stator layer 713. Thereby, each longitudinal stator layer 710 is arranged on the first side 723, 733, 753 and each adjacently arranged oblique stator layer 711 on the second side 724, 734, 754 of the respective two-layer carrier plates 720, 730, 750. In particular, the first further stator assembly 700 exclusively comprises two-layer carrier plates 720, 730, 750, respectively, on the first side 723, 733, 753 of which a longitudinal stator layer 710 and on the second side 724, 734, 754 of which an oblique stator layer 711 is arranged.

In the stator assembly 100, the first further stator assembly 700, the second further stator assembly 701, the fourth further stator assembly 703 and the fifth further stator assembly 704, at least an oblique stator layer 711 is in the third direction 15 arranged beside each longitudinal stator layer 710. In this context, each longitudinal stator layer 710 may be embodied as the first conductor-path layer and the adjacently arranged oblique stator layer 711 as the second conductor-path layer of a two-layer circuit board. Particularly, the stator assembly 100 and the first, second, fourth and fifth further stator assembly 700, 701, 703, 704 may each exclusively comprise two-layer circuit boards, the first conductor-path layer of which is embodied as an oblique stator layer 710 and the second conductor-path layer of which is embodied as an oblique stator layer 711. The longitudinal stator layers 710 and the oblique stator layers 711 of the individual circuit boards may then be connected to each other in an electrically conductive manner with through-contacts, e.g. buried vias, embodied exclusively on the relevant circuit board.

In the stator assemblies 100, 700, 701, 702, 703, 704, 705, the first coil conductors 125 are embodied with an elongated extension in the first direction 12 and as first conductor strips arranged side-by-side in the second direction 14. In addition, the second coil conductors 126 are embodied with an elongated extension in the second direction 12 and as second conductor strips arranged side-by-side in the first direction 12. In alternative embodiments, the stator assemblies 100, 700, 701, 702, 703, 704, 705, the first coil conductors 125 and/or the second coil conductors 126 may be embodied as wires or wound coils. First coil conductors 125 embodied in such a way may, in analogy to the coil conductors 125 embodied as conductor strips, have an elongated extension in the first direction 12 and a side-by-side arrangement in the second direction 14. Likewise, second coil conductors 126 embodied in such a say may, in analogy to the coil conductors 126 embodied as conductor strips, have an elongate extension in the second direction 14 and a side-by-side arrangement in the first direction 12.

In terms of the present invention, the term "stator assembly" merely refers to the arrangement of the longitudinal stator layers 710 and of the oblique stator layer 711 in the third direction 15 and does not implicitly suggest that the longitudinal stator layers 710 and/or the oblique stator layers 711 necessarily have to be mechanically connected to each other. This may, however, be the case with the stator assemblies 100, 700, 701, 702, 703, 704, 705 embodied as circuit boards, in particular as printed circuit boards. Alternatively, the longitudinal stator layers 710 and/or the oblique stator layers 711 may e.g. be embodied as separate plates arranged on top of one another in the third direction 15 and connected to each other with connecting means.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of Reference Numerals (1-240)

1 planar drive system
8 upper side
9 bottom side
10 stator module
11 stator surface
12 first direction
14 second direction
15 third direction
18 connecting line
19 module housing
30 outer edge of stator surface
32 side face of the stator assembly
34 side face of the module housing
36 side face of the stator module
100 stator assembly
101 upper side
102 bottom side
104 first stator layer
105 second stator layer
106 third stator layer
107 fourth stator layer
108 central plane
110 first stator sector
112 second stator sector
113 third stator sector
114 fourth stator sector
120 first stator segments
121 second stator segments
125 first coil conductor
126 second coil conductor
200 rotor
201 magnetic arrangement
206 first rotor direction
208 second rotor direction
210 first magnetic unit
211 first drive magnet
220 second magnetic unit
221 second drive magnet
230 third magnetic unit
240 fourth magnetic unit

TABLE 2

List of Reference Numerals (700-759)

700 first further stator assembly
701 second further stator assembly
702 third further stator assembly
703 fourth further stator assembly
704 fifth further stator assembly
705 sixth further stator assembly
710 longitudinal stator layer
711 oblique stator layer
712 topmost stator layer
713 lowermost stator layer
714 second topmost stator layer
715 second lowermost stator layer
716 interior layers
718 mean distance
719 next lowest stator layer
720 first carrier plate
721 first longitudinal stator layer
722 first oblique stator layer
723 first side of first carrier plate
724 second side of first carrier plate
728 isolating layer
730 second carrier plate
731 second longitudinal stator layer
732 second oblique stator layer
733 first side of second carrier plate
734 second side of second carrier plate
750 further carrier plate
753 first side of further carrier plate
754 second side of further carrier plate
756 first further carrier plate TABLE 2-continued List of Reference Numerals (700-759)

757 second further carrier plate
758 third further carrier plate
759 fourth further carrier plate

The invention claimed is:

1. A stator assembly for driving a rotor of an electrical planar motor, wherein the stator assembly comprises:
a first arrangement of longitudinal stator layers; and
a second arrangement of oblique stator layers;
wherein the longitudinal stator layers comprise first coil conductors and wherein the oblique stator layers comprise second coil conductors,
wherein the second coil conductors are configured to interact with second drive magnets of the rotor in order to drive the rotor in a first direction,
wherein the first coil conductors are configured to interact with the first drive magnets of the rotor in order to drive the rotor in a second direction differing from the first direction,
wherein the longitudinal stator layers and the oblique stator layers are arranged on top of one another in a third direction oriented perpendicularly to the first and second direction, and
wherein the longitudinal stator layers and the oblique stator layers have the same mean distance from a stator surface of the stator assembly in the third direction.

2. The stator assembly of claim 1,
wherein the first arrangement of longitudinal stator layers and the second arrangement of oblique stator layers comprise a shared central plane, and
wherein the longitudinal stator layers and the oblique stator layers are each arranged symmetrically to the shared central plane in the third direction.

3. The stator assembly of claim 1, wherein a first total number of longitudinal stator layers and a second total number of oblique stator layers are equal.

4. The stator assembly of claim 1, wherein the first arrangement comprises six longitudinal stator layers and the second arrangement comprises six oblique stator layers.

5. The stator assembly of claim 1,
wherein a topmost stator layer of the stator assembly and a lowermost stator layer of the stator assembly are each configured as a longitudinal stator layer having first coil conductors, and
wherein a second topmost stator layer of the stator assembly and a second lowermost stator layer of the stator assembly are each configured as oblique stator layers having second coil conductors.

6. The stator assembly of claim 1,
wherein the stator assembly comprises interior layers arranged within the stator assembly, and
wherein the interior layers of the stator assembly are each alternatingly configured as two adjacent oblique stator layers and as two adjacent longitudinal stator layers.

7. The stator assembly of claim 1,
wherein the first coil conductors are configured as conductor strips having an elongated embodiment extending along the first direction, and
wherein the second coil conductors are configured as conductor strips having an elongated embodiment extending along the second direction.

8. The stator assembly of claim 1, wherein the stator assembly is configured as a multi-layer circuit board.

9. The stator assembly of claim 1,
wherein the first coil conductors of the longitudinal stator layers extending in an elongated manner in the first direction and the second coil conductors of the oblique stator layers extending in an elongated manner in the second direction, and
wherein the first and second directions are oriented perpendicularly with regard to each other.

10. A stator assembly for driving a rotor of an electrical planar motor, wherein the stator assembly comprises:
a first arrangement of longitudinal stator layers and a second arrangement of oblique stator layers,
wherein the longitudinal stator layers comprise first coil conductors and wherein the oblique stator layers comprise second coil conductors,
wherein the second coil conductors are configured to interact with second drive magnets of the rotor in order to drive the rotor in a first direction,
wherein the first coil conductors are configured to interact with the first drive magnets of the rotor in order to drive the rotor in a second direction differing from the first direction,
wherein the longitudinal stator layers and the oblique stator layers are arranged on top of one another in a third direction oriented perpendicularly to the first and second direction, and
wherein the first arrangement of longitudinal stator layers and the second arrangement of oblique stator layers have a shared central plane and the longitudinal stator layers and the oblique stator layers are each symmetrical in the third direction with regard to the shared central plane.

11. The stator assembly of claim 10, wherein a first total number of longitudinal stator layers and a second total number of oblique stator layers are equal.

12. The stator assembly of claim 10, wherein the first arrangement comprises six longitudinal stator layers and the second arrangement comprises six oblique stator layers.

13. The stator assembly of claim 10,
wherein a topmost stator layer of the stator assembly and a lowermost stator layer of the stator assembly are each configured as a longitudinal stator layer having first coil conductors, and
wherein a second topmost stator layer of the stator assembly and a second lowermost stator layer of the stator assembly are each configured as oblique stator layers having second coil conductors.

14. The stator assembly of claim 10,
wherein the stator assembly comprises interior layers arranged within the stator assembly, and
wherein the interior layers of the stator assembly are each alternatingly configured as two adjacent oblique stator layers and as two adjacent longitudinal stator layers.

15. The stator assembly of claim 10, wherein the first coil conductors are configured as conductor strips having an elongated embodiment extending along the first direction and wherein the second coil conductors are configured as conductor strips having an elongated embodiment extending along the second direction.

16. A planar-drive system having a stator module and a rotor, wherein the stator module comprises:
a module housing and a stator assembly,
wherein the stator assembly comprises a first arrangement of longitudinal stator layers and a second arrangement of oblique stator layers, wherein the longitudinal stator layers comprise first coil conductors and wherein the oblique stator layers comprise second coil conductors, wherein the second coil conductors are configured to interact with second drive magnets of the rotor in order to drive the rotor an a first direction, wherein the first coil conductors are configured to interact with first drive magnets of the rotor in order to drive the rotor in a second direction differing from the first direction, wherein the longitudinal stator layers and the oblique stator layers are arranged on top of one another in a third direction oriented perpendicularly to the first and second direction, wherein the stator assembly being arranged above the module housing at an upper side of the stator module and comprising a planar stator surface on the upper side of the stator module, and wherein the rotor is arranged above the stator surface of the stator module in in a floating position over the stator surface.

17. The planar-drive system of claim 16, wherein the longitudinal stator layers and the oblique stator layers have the same mean distance from a stator surface of the stator assembly in the third direction.

18. The planar-drive system of claim 16,
wherein the first arrangement of longitudinal stator layers and the second arrangement of oblique stator layers comprise a shared central plane, and
wherein the longitudinal stator layers and the oblique stator layers are each arranged symmetrically to the shared central plane in the third direction.

19. The planar-drive system of claim 16, wherein a first total number of longitudinal stator layers and a second total number of oblique stator layers are equal.

20. The planar-drive system of claim 1, wherein the first coil conductors of the longitudinal stator layers extending in an elongated manner in the first direction and the second coil conductors of the oblique stator layers extending in an elongated manner in the second direction, wherein the first and second directions are oriented perpendicularly with regard to each other.

* * * * *